United States Patent [19]
Franchuk

[11] Patent Number: 5,139,375
[45] Date of Patent: Aug. 18, 1992

[54] ADJUSTABLE MOUNTING SYSTEM

[76] Inventor: Robert J. Franchuk, 7100 - 139th Pl., Redmond, Wash. 98052

[21] Appl. No.: 548,029

[22] Filed: Jul. 5, 1990

[51] Int. Cl.$^5$ .............................................. B60P 7/10
[52] U.S. Cl. ........................... 410/105; 248/499; 248/503; 296/104; 296/100; 410/106; 410/110; 410/126; 410/130; 410/150
[58] Field of Search ............. 410/96, 101, 102, 104, 410/105, 106, 108, 109, 110, 115, 126, 130, 132, 133, 134, 139, 150, 8, 10, 11, 152, 9, 13, 14, 15, 16, 17, 18, 74; 296/36, 41, 104, 100; 248/499, 503

[56] References Cited

U.S. PATENT DOCUMENTS

| | | | |
|---|---|---|---|
| 1,708,231 | 4/1929 | Moore et al. | 410/9 |
| 1,816,897 | 8/1931 | Fedderman et al. | 410/9 |
| 1,824,983 | 9/1931 | Copony | 410/9 |
| 1,934,697 | 11/1933 | Butterworth | 410/10 |
| 2,122,950 | 7/1938 | Reifer | 410/152 |
| 2,165,652 | 7/1939 | Reifer et al. | 410/152 |
| 2,190,636 | 2/1940 | Mussey | 410/11 |
| 2,354,861 | 8/1944 | Hermann | 410/150 |
| 2,563,799 | 8/1951 | Nampa | 410/150 |
| 2,603,167 | 7/1952 | Webster et al. | 410/152 |
| 2,891,490 | 6/1959 | Elsner | 410/105 |
| 3,160,117 | 12/1964 | Willison et al. | 410/74 |
| 3,566,804 | 2/1971 | Mietla | 410/11 |
| 3,601,349 | 8/1971 | Murphy, Jr. | 410/104 |
| 3,641,941 | 2/1972 | Sanders | 410/134 |
| 3,774,552 | 11/1973 | Snyder et al. | 410/152 |
| 3,788,240 | 1/1974 | Nadherny | 410/152 X |
| 3,797,656 | 3/1974 | Kitchen, Jr. et al. | 410/11 X |
| 3,831,976 | 8/1974 | Iden, Sr. | 280/179 A |
| 3,854,424 | 12/1974 | Blunder et al. | 410/11 |
| 3,865,049 | 2/1975 | Hassellof et al. | 410/139 X |
| 3,877,671 | 4/1975 | Underwood et al. | 248/499 X |
| 4,008,669 | 2/1977 | Sumrell | 248/499 |
| 4,013,203 | 3/1977 | McCauley | 248/503 X |
| 4,020,769 | 5/1977 | Keir | 410/96 |
| 4,138,950 | 2/1979 | Mooney et al. | 410/102 |
| 4,248,558 | 3/1981 | Lechner | 410/110 X |
| 4,448,337 | 5/1984 | Cronce | 410/130 X |
| 4,604,013 | 8/1986 | Elwell et al. | 410/106 |
| 4,650,382 | 3/1987 | Johnson | 410/110 |
| 4,668,142 | 5/1987 | Fity et al. | 410/8 X |
| 4,682,922 | 7/1987 | Andre et al. | 410/9 |
| 4,850,767 | 7/1989 | Andre et al. | 410/9 |
| 4,850,769 | 7/1989 | Matthews | 410/105 |
| 4,850,770 | 7/1989 | Millar, Jr. | 410/110 |
| 4,872,719 | 10/1989 | Cardwell | 296/34 |
| 4,915,342 | 4/1990 | Nilsson | 410/105 X |
| 4,948,311 | 8/1990 | St Pierre et al. | 410/110 X |
| 4,958,875 | 9/1990 | Zamzow | 248/503 X |

Primary Examiner—Robert J. Spar
Assistant Examiner—Robert S. Katz
Attorney, Agent, or Firm—Cassidy, Vance & Tarleton

[57] ABSTRACT

Apparatus for removably and adjustably mounting one or more of a wide variety of accessories to a universal, elongated bar rail (52) and ratchet strip (54) which in turn are secured to an underlying support surface. The ratchet strip (54) has outwardly extending teeth (58) and is generally hidden beneath the generally smooth, aesthetically pleasing, protective bar rail (52). The types of accessories that can be used with the invention include without limitation: a simple hook clip (72); a spring biased tie down clip (96); a heavy duty tie down ring and clamp (106 and 104); a cargo net (78); a tonneau cover (80); an extendable cargo holder bar (140); a low rack support system (162); a raised rack support system (186); a cantilevered, long load, over cab, rack support system (230); a canopy (248); and vertical posts (302, 308, and 310) and box boards (300).

33 Claims, 10 Drawing Sheets

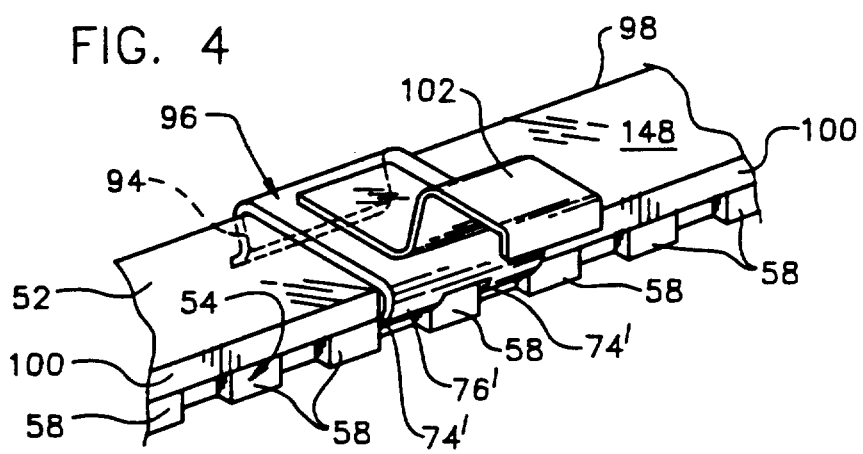
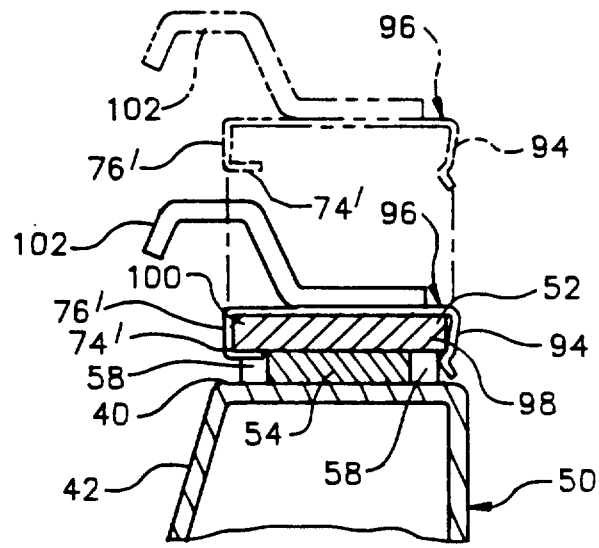
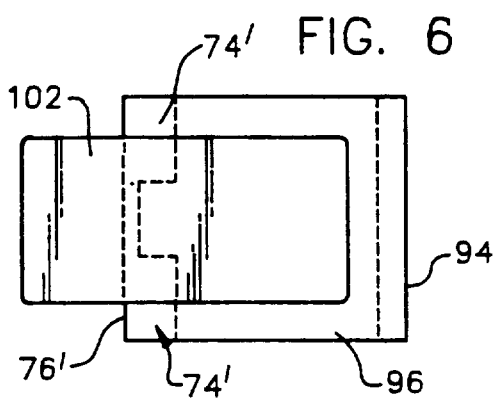
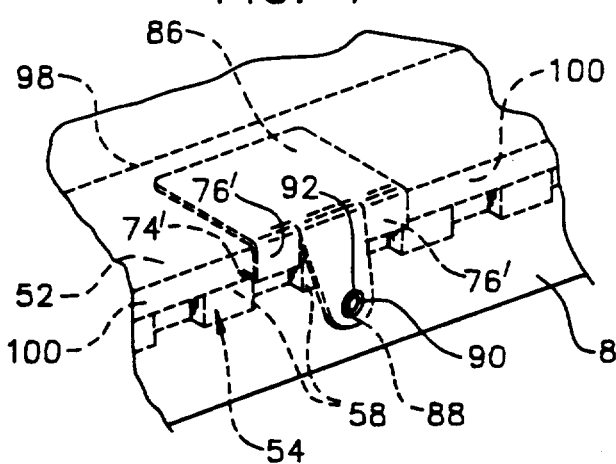
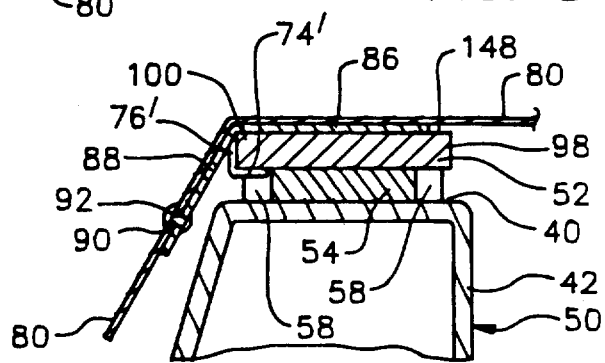

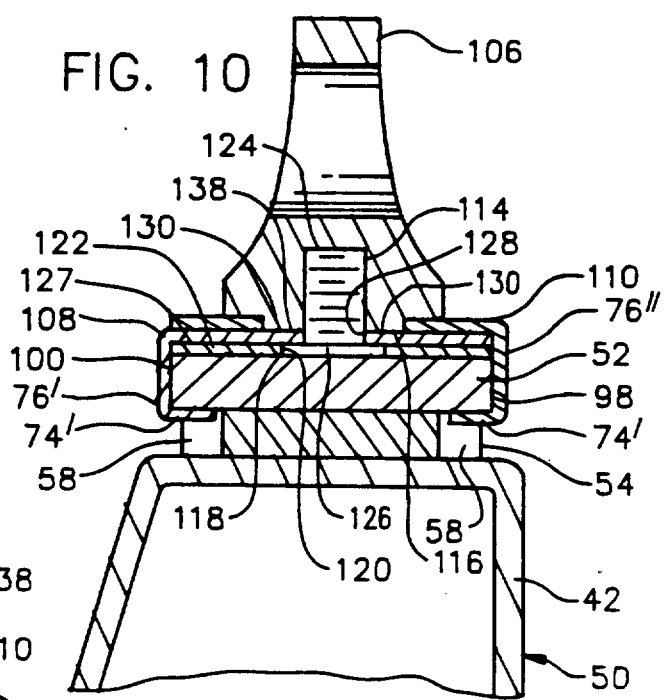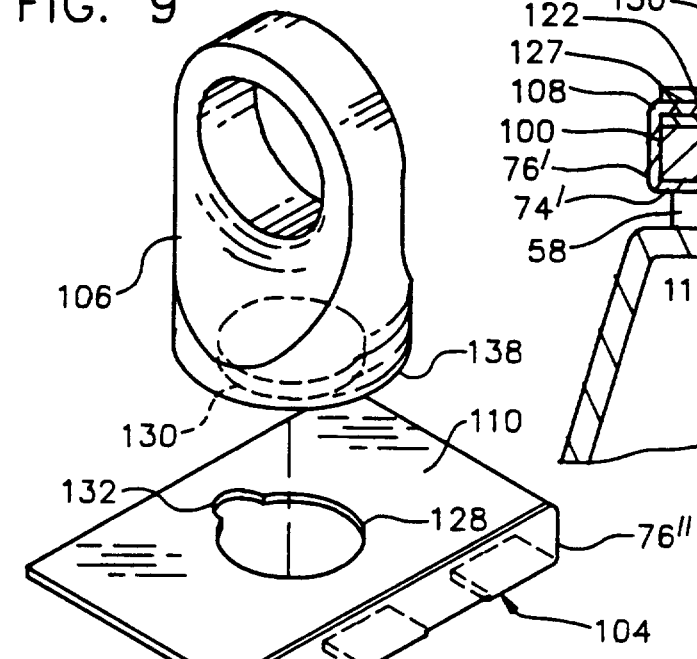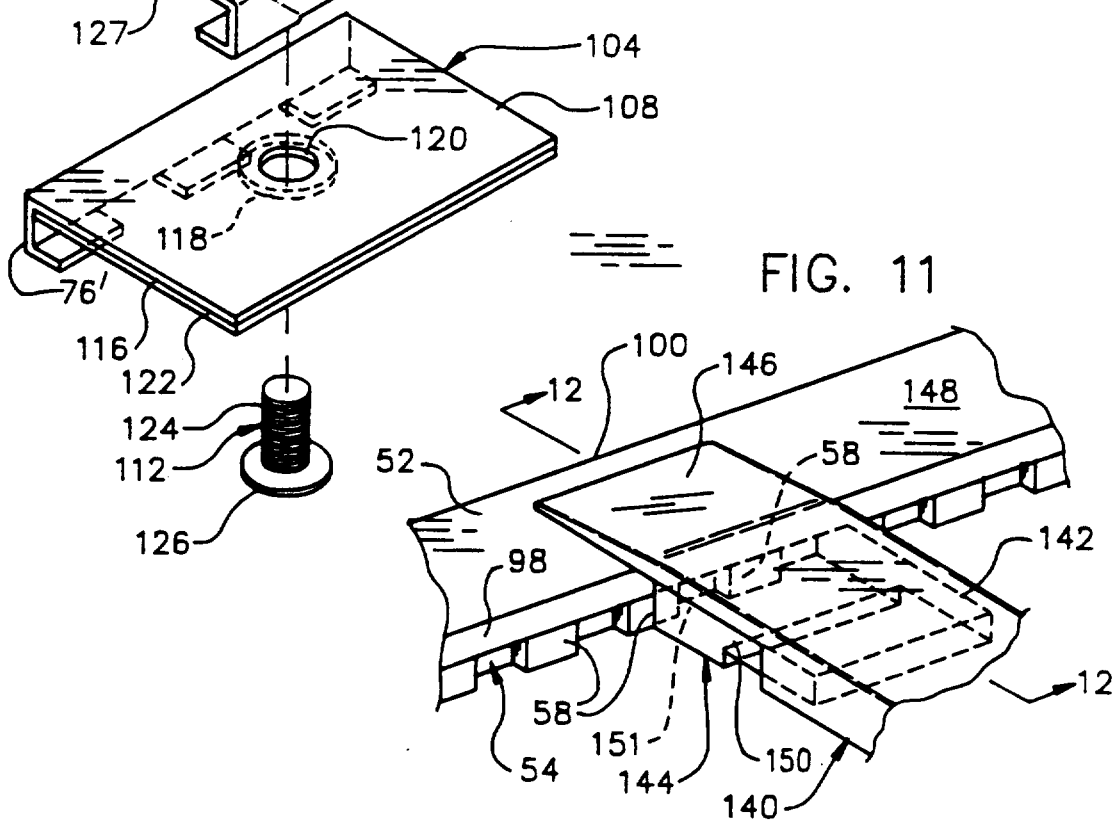

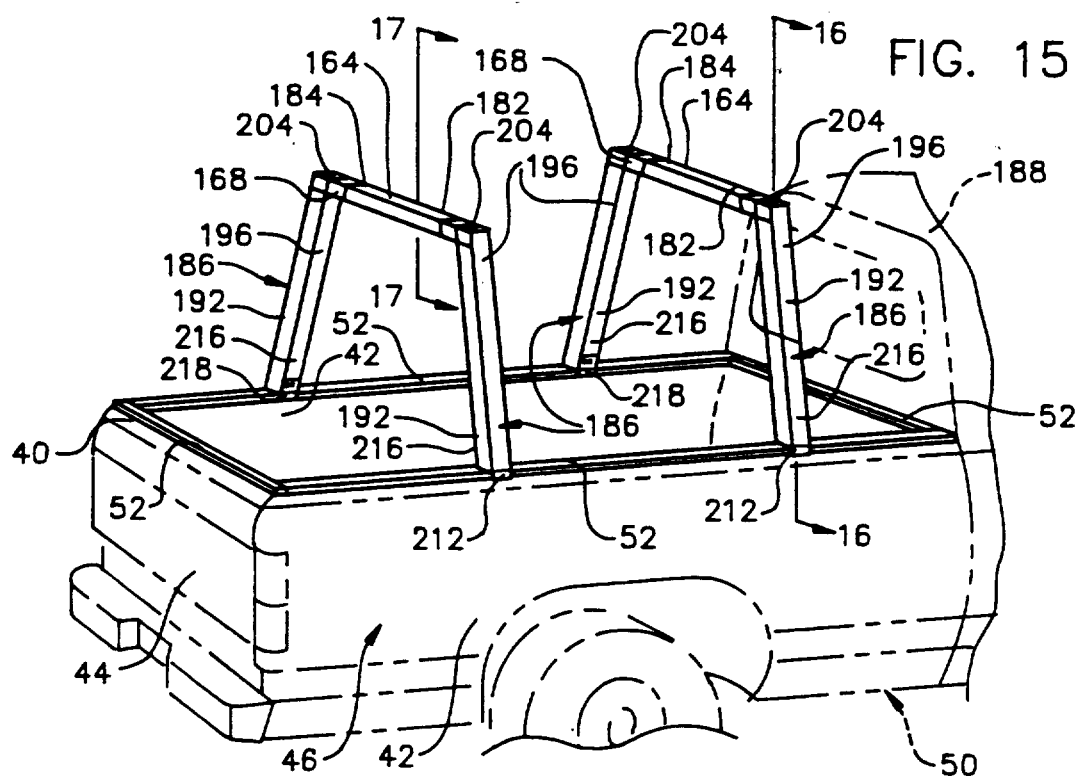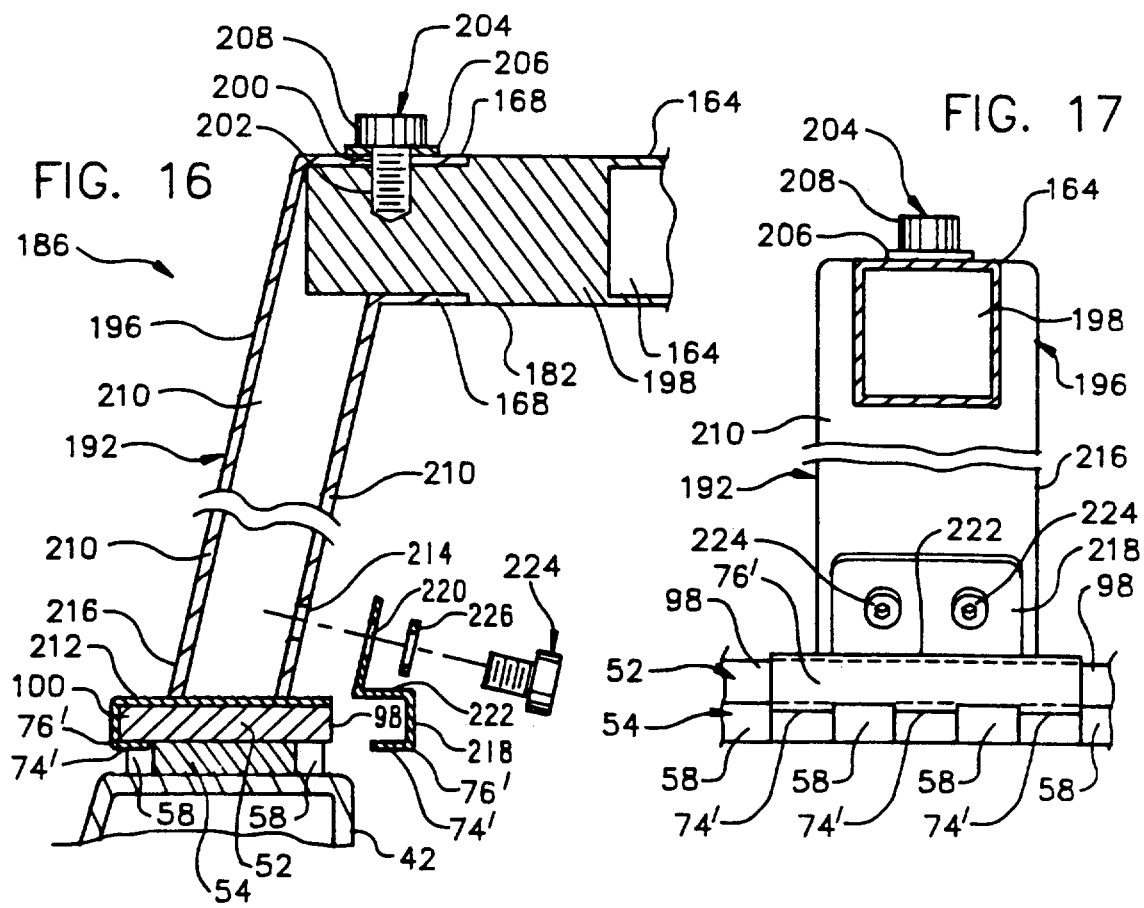

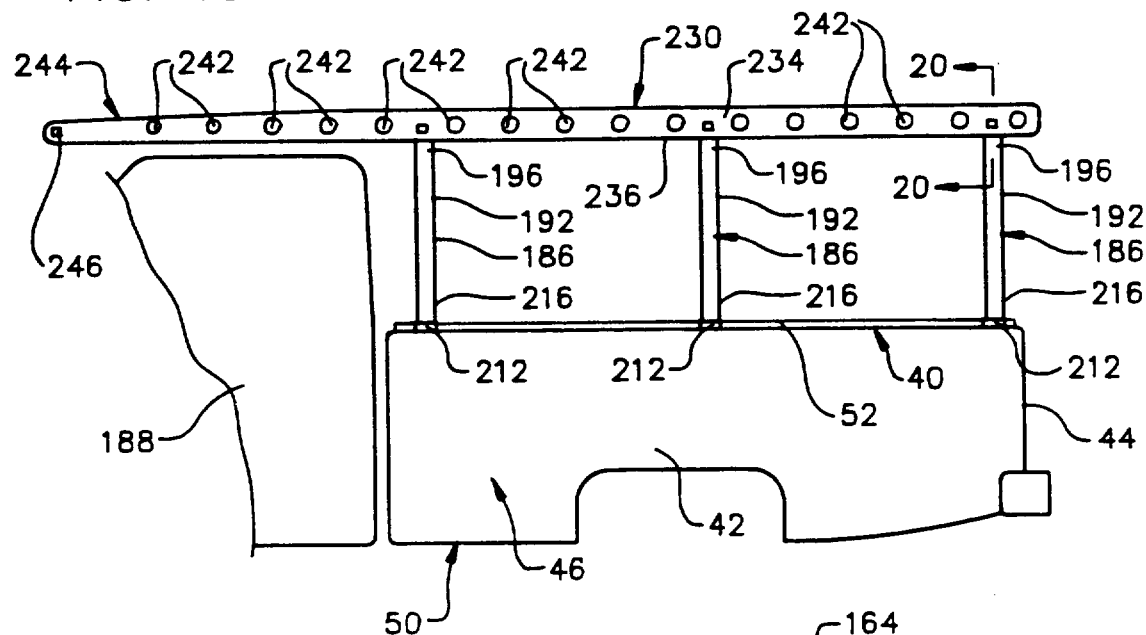
FIG. 18
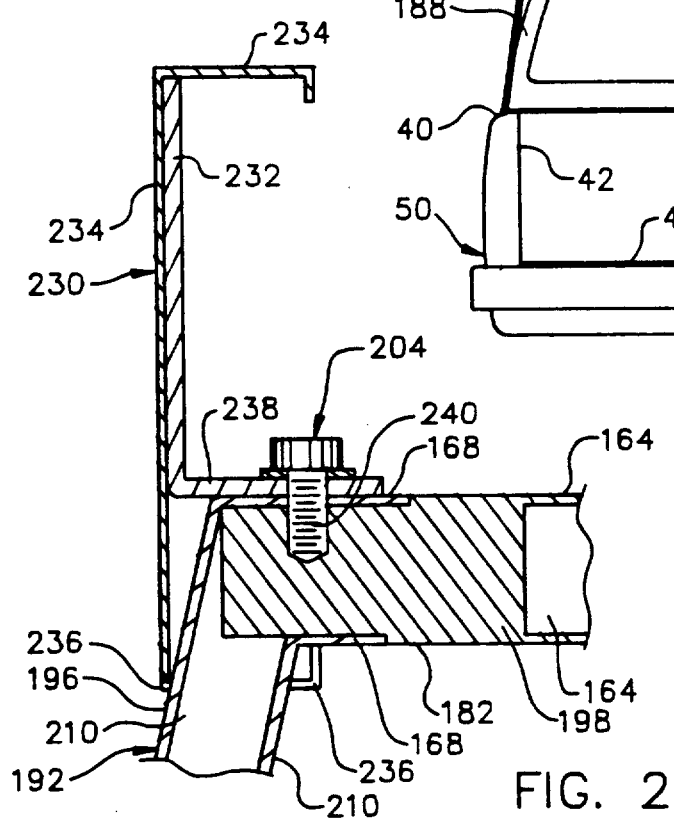
FIG. 19
FIG. 20

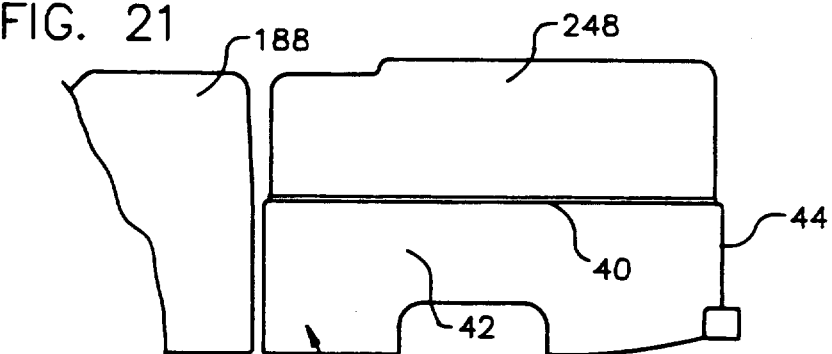
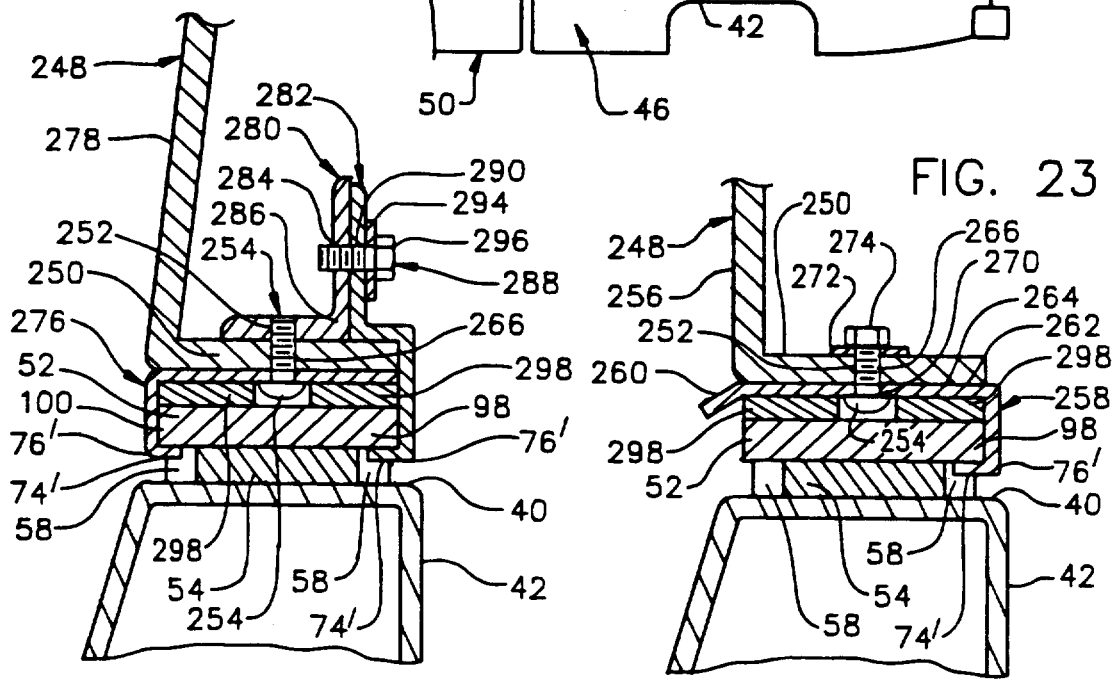
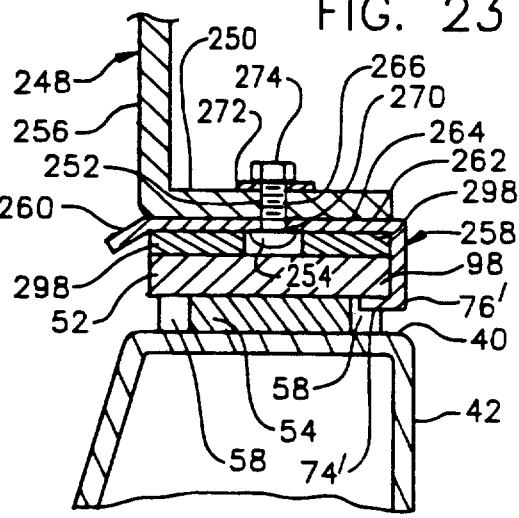
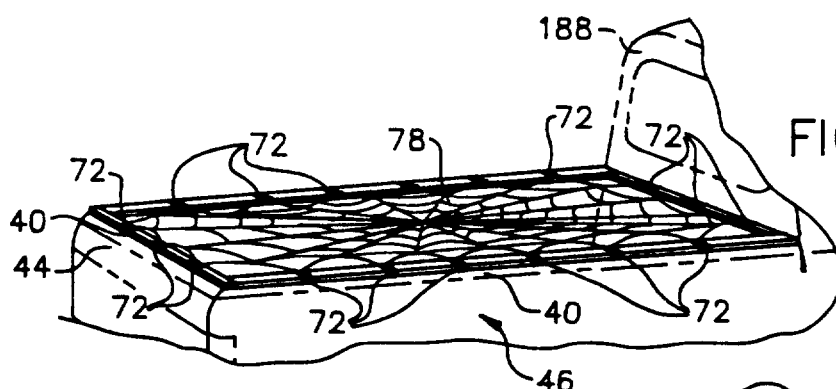
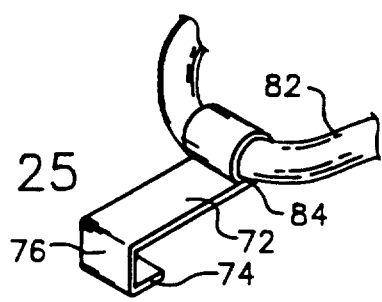
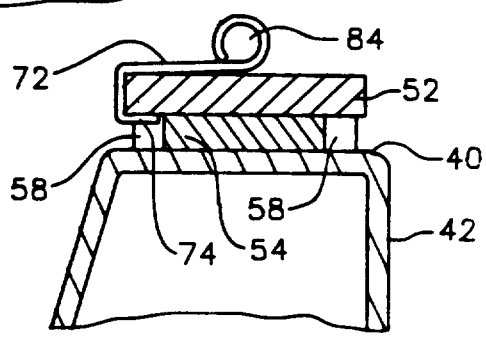

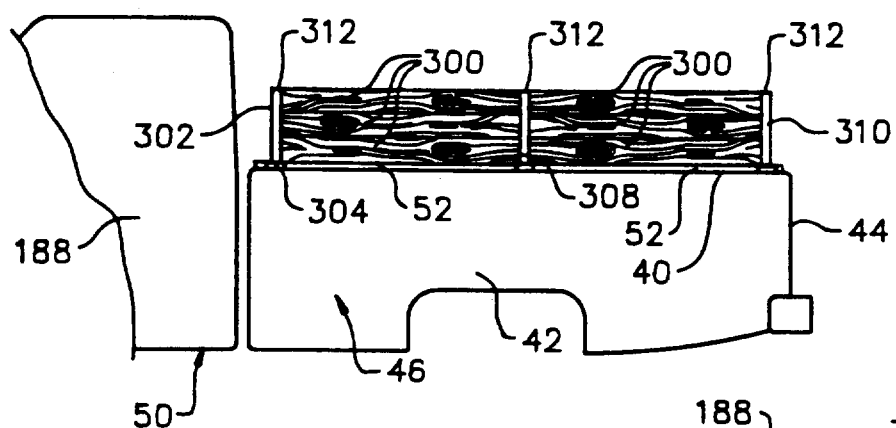
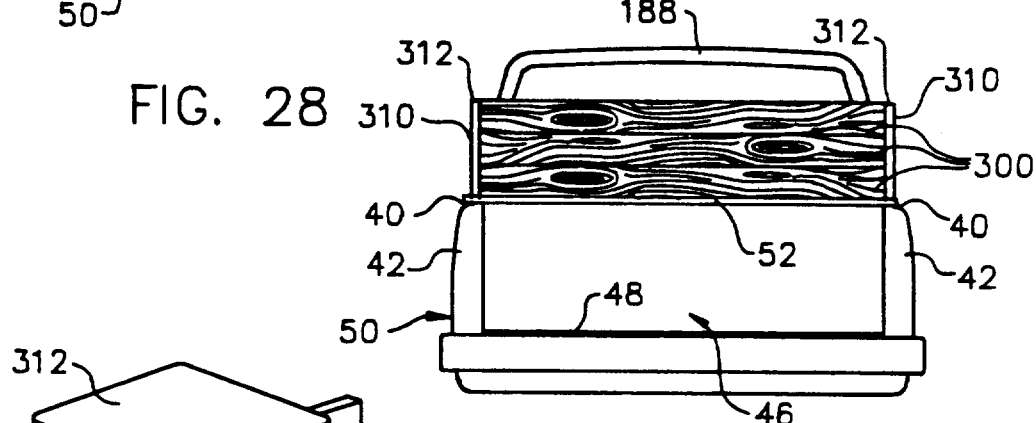
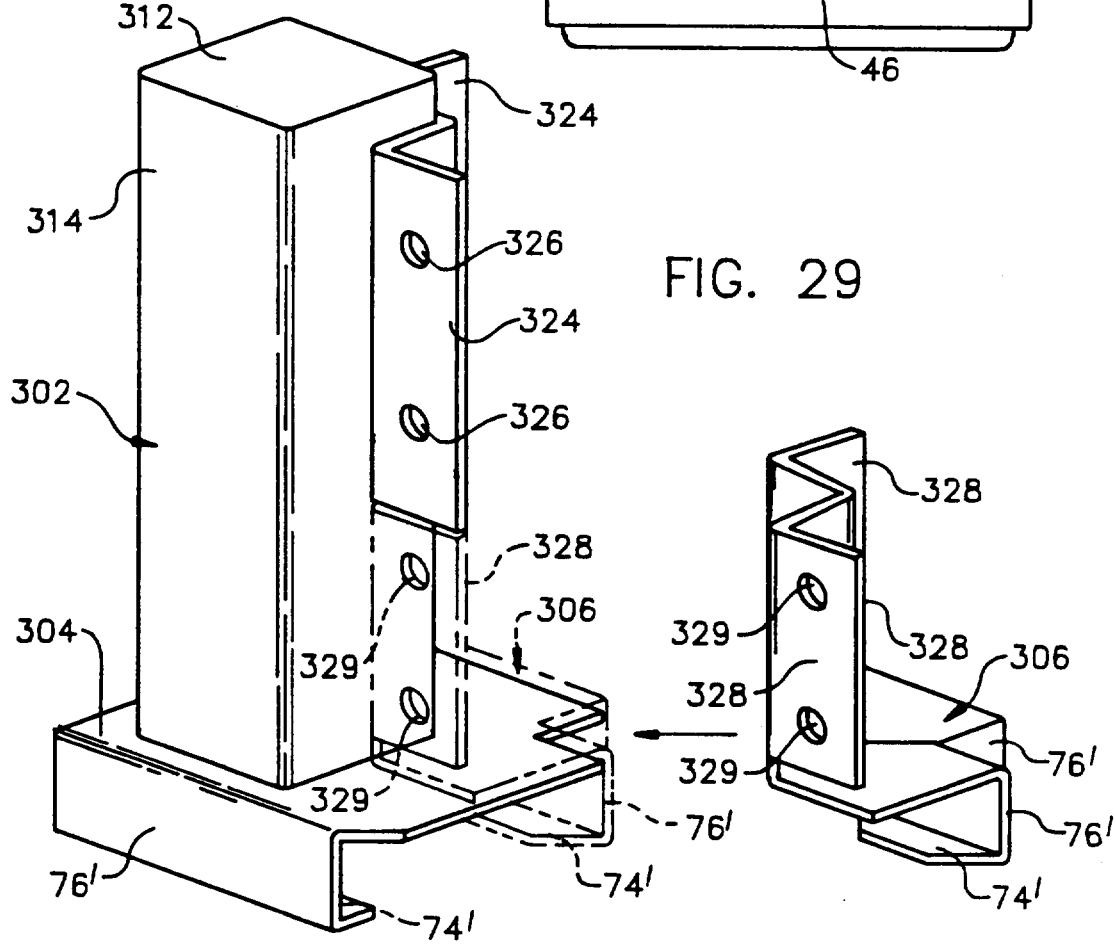

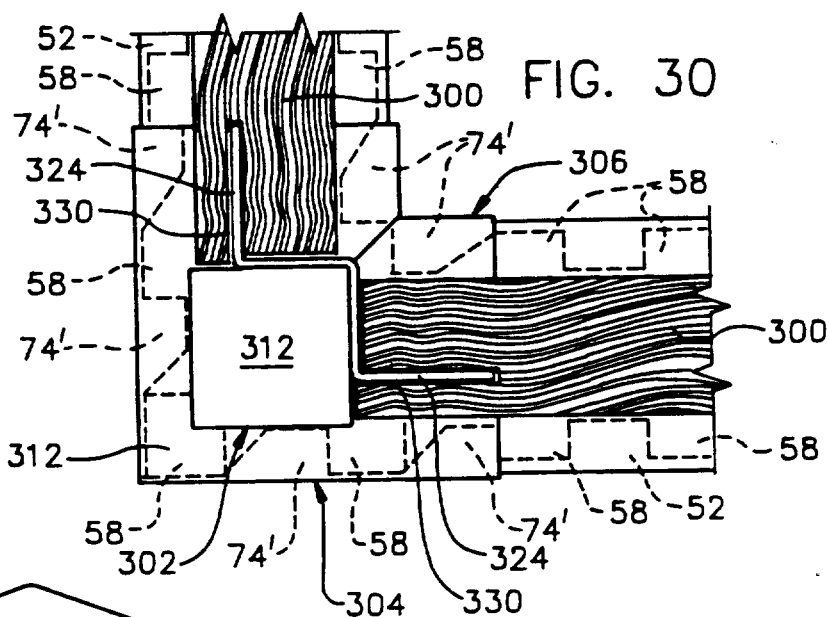
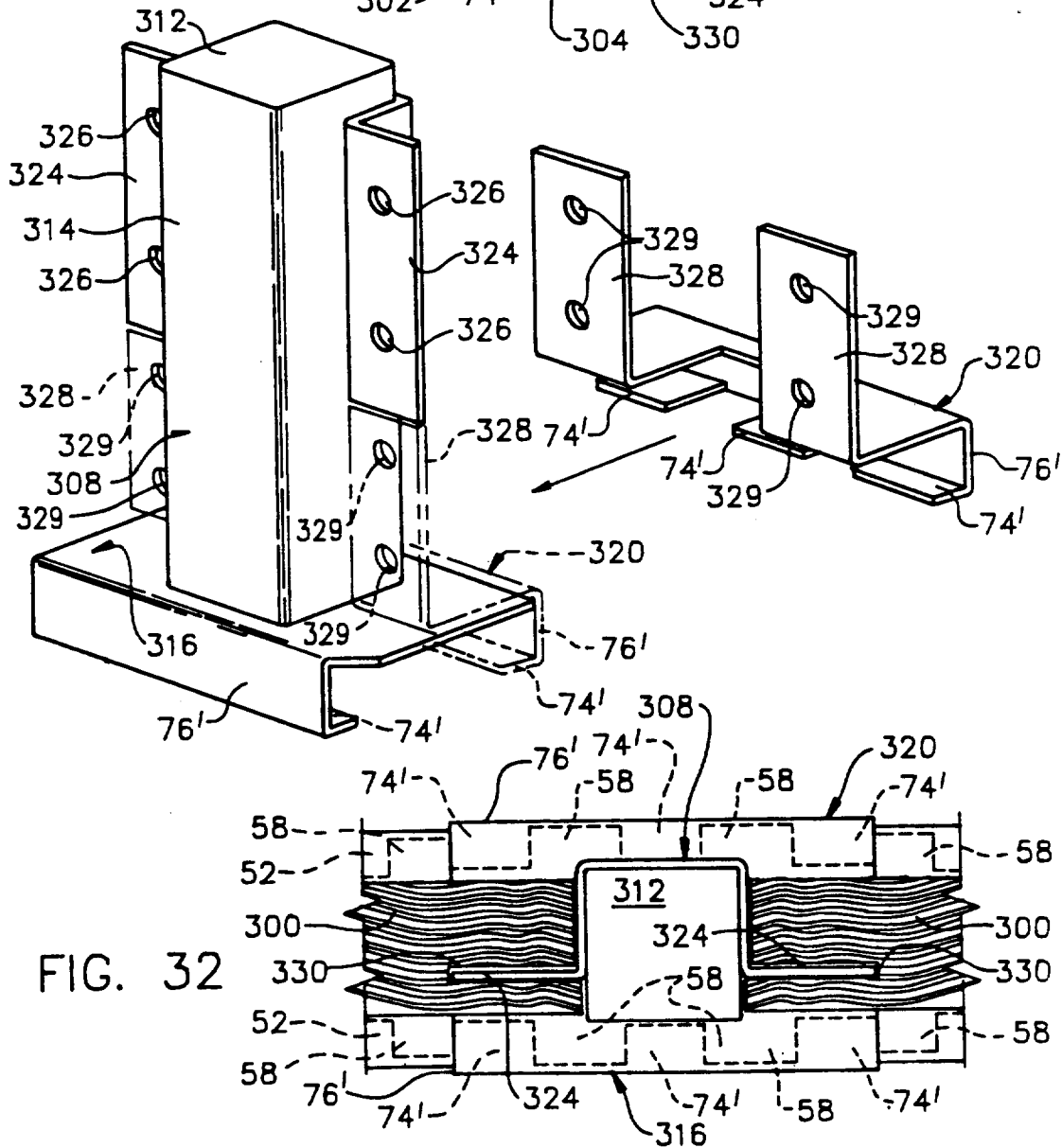

ADJUSTABLE MOUNTING SYSTEM

COPYRIGHT NOTICE

© Copyright 1990, James R. Vance. All Rights Reserved.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

This invention relates to apparatus and methods for adjustably securing a wide variety of accessories and devices to an underlying support structure. More particularly, this invention relates to adjustable mounting systems which are mounted to a truck box, cargo bed, boat deck, or the like, and which engage and secure a wide variety of cargo holding devices.

BACKGROUND ART

Within the automotive, storage, and maritime industries, there has been a long felt need for an effective mounting system which allows straps, spacer bars, brace bars, and other cargo holding devices to be adjustably secured to an underlying support structure.

Traditional practice is to permanently secure a ring, cleat, hook, or similar device, to the underlying support structure. Such devices, however, limit the type of cargo holding apparatus that can be used to standard tie-down ropes, cords, cables, and belts. Access to the ring or cleat must first be obtained and then a tie-down rope is looped therethrough. Where a hook is used, the tie-down rope is passed around the hook and then held then in place to prevent inadvertent release.

Such traditional devices and tie-down ropes are difficult and time consuming to secure, are highly susceptible to operational error, and typically expose the rope to severe damage from rubbing or being cut from the loading and unloading of cargo. In addition, rings, cleats, and hooks require a large amount of access room for proper use, and are relatively ineffective if the permitted working area is restricted.

Unless the rings, cleats, and hooks are properly located, the cargo may shift, be damaged, or cause danger to cargo handlers. To provide adjustment in tying down and securing cargo, a large number of rings, cleats, or hooks are needed. By necessity such devices are secured to the support structure. Use of multiple rings, cleats, or hooks weaken the support structure. They also increase the likelihood that cargo and cargo handlers will become damaged or injured due to being rubbed or impacted against such devices. Multiple rings, cleats, and hooks are generally not aesthetically appealing if they interrupt the smooth lines of the underlying support structure.

In an attempt to fill the aforesaid need, the following patents and devices have been created: Iden, Sr. (U.S. Pat. No. 3,831,976; issued Aug. 27, 1974); Elwell et al. (U.S. Pat. No. 4,604,013; issued Aug. 5, 1986); Johnson (U.S. Pat. No. 4,650,382; issued Mar. 17, 1987); Matthews (U.S. Pat. No. 4,850,769; issued July 25, 1989); Millar, Jr. (U.S. Pat. No. 4,850,770; issued July 25, 1989); and Cardwell (U.S. Pat. No. 4,872,719; issued Oct. 10, 1989).

Heretofore, such apparatus and methods for securing cargo to an underlying support structure have often been dangerous, unsightly, and could only be used with a limited number of standard accessories. Each cargo holding accessory required a separate means or device to attach it to the support structure. Thus, tooling, manufacture, use, and removal of a wide variety of devices for a single support structure was time consuming, expensive, inefficient, and often impossible. It is not uncommon that such devices cause damage to the contained cargo.

When used with a vehicle, such as a pickup truck, such cargo holding apparatus often must be specially designed, customized, outfitted, and installed. Such equipment is either permanently installed or at least is difficult to remove and has not been very flexible for varied loads. In addition, many of such devices require a considerable amount of space for operation and are of limited utility where access is limited.

The inventor believes that the listed patents and known prior art taken alone or in combination neither anticipate nor render obvious the present invention. These citations do not constitute an admission that such disclosures are relevant or material to the present claims. Rather, these citations relate only to the general field of the disclosure and are cited as constituting the closest art of which the inventor is aware.

DISCLOSURE OF INVENTION

The present invention may be used within a wide variety of industries wherein simple, easily used, inexpensive apparatus and methods are desired to secure cargo to a support structure. More particularly, this invention provides apparatus and methods for adjustably mounting and securing one or more of a wide variety of accessories to an underlying support structure.

The claimed apparatus and methods further contemplate use of traditional and/or nontraditional accessories, including without limitation: a simple hook clip; a spring biased tie down clip; a heavy duty tie down ring and clamp; a cargo net; a tonneau cover; an extendable cargo holder bar; a low rack support system; a raised rack support system; a cantilevered, long load, over cab, rack support system; a canopy; and vertical posts and box boards. Each of these accessories are described in detail in the following text.

The present invention is a compact, functional, efficient, reliable, reusable, durable, rugged, easily constructed, inexpensive and economical to manufacture apparatus that requires minimal manipulation and is simple to use. Furthermore, the present invention allows the accessories to have a wide variety of attachment locations with respect to the support structure. The present invention not only increases the speed and simplifies the procedure to secure accessories to the support structure, it also provides an unobtrusive protective barrier for the support structure, and requires less access room for operation and does not damage adjacent material. The present invention also overcomes all of the previously mentioned disadvantages.

To achieve these general and specific objects the present invention comprises: (a) a universal, elongated rack or ratchet strip; (b) an elongated bar rail; and (c) means for securing the ratchet strip and bar rail to the support structure.

One unique feature of the present invention is that the ratchet strip has outwardly extending teeth or protrusions. Each of the above-mentioned accessories, which are described below in great detail, are provided with corresponding inwardly projecting teeth which intermesh with and engage the teeth of the ratchet strip. Such engagement restricts longitudinal movement of the accessory with respect to the ratchet strip and the bar rail.

During use, the ratchet strip is juxtaposed between the support structure and the elongated bar rail. The ratchet strip is generally hidden beneath the elongated, generally smooth, aesthetically pleasing, protective bar rail. The bar rail not only protects the teeth of the ratchet strip, but also protects the underlying support structure from damage and abuse.

Means for securing the ratchet strip and bar rail to the support structure are also provided. Such means may comprise simple screws, bolts, adhesive, welding, or the like.

The aforementioned accessories are secured to the bar rail by using a clip and/or clamp having a hooked flange which hooks onto an edge of the bar rail. The hooked flange is also provided with teeth which project inwardly to intermesh with and engage the teeth of the ratchet strip.

Thus positioned, the accessory is removably secured to the bar rail. The engaged clip or clamp prevents transverse movement of the accessory with respect to the bar rail. The intermeshed teeth of the clip and/or clamp, and ratchet strip prevent longitudinal movement of the accessory with respect to the bar rail. Since the bar rail and ratchet strip are fixedly secured to the support structure, attachment of any such accessory to the bar rail removably secures the accessory to the underlying support structure.

The present invention also contemplates methods of adjustably securing accessories to the support structure. Such methods include the steps of: (a) juxtaposing an elongated ratchet strip having a plurality of outwardly extending teeth between the support structure and an elongated bar rail; and (b) securing the bar rail and ratchet strip to the support structure. Additional steps of securing one or more of the above-mentioned accessories to the bar rail may also be followed.

The present invention greatly simplifies conventional adjustable mounting systems, and provides apparatus and methods to secure cargo and accessories to an underlying support structure with greater accuracy and in an exact and efficient manner, thereby saving time and cost. Each cargo holding accessory uses a universal means for attachment to the support structure. The present invention reduces if not totally eliminates damage caused to contained cargo and cargo handlers. Requirements of special designs, customization, and difficult installation for particular uses are eliminated. The accessories may be either permanently installed or easily removed. The accessories may also be placed at a wide variety of locations along the length of the bar rail. A minimal amount of operational room and space is required to use the present invention, thereby making this invention ideal for use where access is limited. In other words, the present invention can be used with great ease and reliability even in confined locations. The invention is also easily and inexpensively manufactured, and is simple and efficient to use.

These and other objects and advantages of the present invention will become more readily apparent upon reading the following disclosure and referring to the attached drawings.

BRIEF DESCRIPTION OF DRAWINGS

FIG. 4 is a partial, isometric view of a spring biased tie down clip secured to the bar rail and ratchet strip of the present invention.

FIG. 5 is a partial, cross-sectional, side-elevational view of the spring biased tie down clip secured to the bar rail and ratchet strip shown in FIG. 4.

FIG. 6 is a plan view of the spring biased tie down clip illustrated in FIGS. 4 and 5.

FIG. 7 is a partial, isometric view of a tonneau cover and tie down clip secured to a bar rail and ratchet strip.

FIG. 8 is a partial, cross-sectional, side-elevational view of the tonneau cover, tie down clip, bar rail, and ratchet strip shown in FIG. 7 secured to a support structure.

FIG. 9 is an exploded, isometric view of a heavy duty tie down ring and clamp.

FIG. 10 is a partial, cross-sectional, side-elevational view of the heavy duty tie down ring and clamp shown in FIG. 9 secured to a bar rail, ratchet strip, and support structure.

FIG. 11 is a partial, isometric view of an extendable and contractible cargo holder bar engaging a bar rail and ratchet strip of this invention.

FIG. 15 is a schematic view of a raised rack support system secured to the bar rails and ratchet strips of the present invention.

FIG. 16 is a partial, cross-sectional, exploded, side-elevational view of the raised rack support system as seen along line 16—16 of FIG. 15.

FIG. 17 is a partially sectioned, side-elevational view of the raised rack support system as seen along line 17—17 of FIG. 15.

FIG. 18 is a side-elevational view of a long load, over cab, rack support system which is secured to a plurality of raised rack support systems as shown in FIGS. 15 through 17.

FIG. 19 is a side-elevational view of the long load, over cab, rack support system shown in FIG. 18.

FIG. 20 is an enlarged, partial, cross-sectional, side-elevational view of the long load, over cab, rack support system of FIGS. 18 and 19 secured to the raised rack support system shown in FIGS. 15 through 19.

FIG. 21 is a side-elevational view of a canopy secured to a truck box by means of the present invention.

FIG. 22 is a partial, cross-sectional, side-elevational view of the side of the canopy shown in FIG. 21 secured to the bar rails and ratchet strip of FIGS. 2 and 3.

FIG. 23 is a partial, cross-sectional, side-elevational view of the front of the canopy shown in FIG. 21 secured to the bar rails and ratchet strip of FIGS. 2 and 3.

FIG. 24 is a schematic view of a cargo net secured to the bar rails and ratchet strips of the present invention.

FIG. 25 is an isometric view of a fastener clip used in FIG. 24.

FIG. 26 is a partial, cross-sectional, side-elevational view of the fastener clip shown in FIGS. 24 and 25 secured to a bar rail and ratchet strip.

FIG. 27 is a side-elevational view of vertical posts and horizontal box boards secured to a vehicle by means of the present invention.

FIG. 28 is a side-elevational view looking from the rear of the vehicle illustrating vertical posts and horizontal box boards secured to the box and tailgate of the vehicle.

FIG. 29 is an exploded isometric view of a front corner post and front corner retainer clip.

FIG. 30 is a plan view of the front corner post and front corner retainer clip shown in FIG. 29 secured to bar rails, ratchet strips, and side boards.

FIG. 31 is an exploded isometric view of a side post and side retainer clip.

FIG. 32 is a plan view of the side post and side retainer clip shown in FIG. 31 secured to a bar rail, ratchet strip, and side boards.

Figure 1:
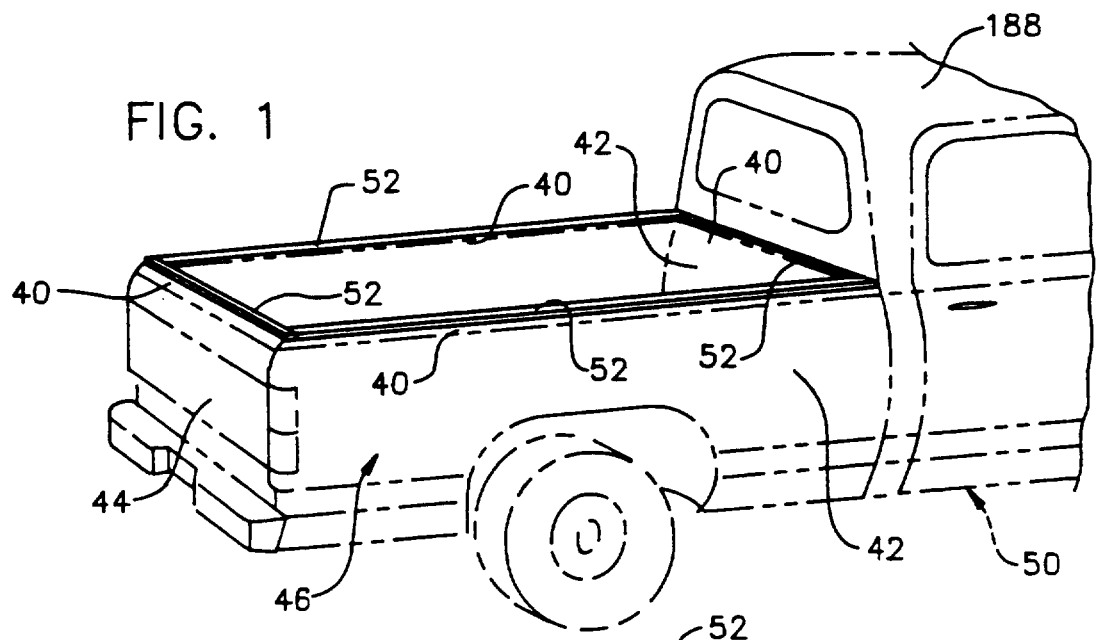
FIG. 1 is a schematic view illustrating the attachment of elongated bar rails and ratchet strips of the present invention to the upper perimeter of the side walls and tailgate of a truck box.

One should understand that the drawings are not necessarily to scale and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

SUPPORT STRUCTURE

The present invention is designed to be used in conjunction with a large variety of support structures. For example, referring to the drawings wherein like numerals indicate like parts, FIGS. 1, 13, 15, 18, 19, 21, 24, 27, and 28 illustrate the present invention secured to an upper perimeter 40 of the side walls 42 and tailgate 44 of a truck box 46. The present invention may similarly be secured to the interior or exterior side walls 42 of truck box 46, to a cargo bed 48 of the truck box 46, or to the underside of a semi-truck trailer.

Where a van or enclosed truck box is used, the invention may be secured to the floor, interior walls, or ceiling of the vehicle. The invention may likewise be used on any surface of a storage container, or be used on or within an automobile, boat, yacht, ship, or airline. For example the invention may be secured to the floor of a vehicle, and chairs, tables or other objects may be secured thereto.

The present invention has such versatility it may also be used to hold store displays, shelving, or even be placed on the side of a building to hold and secure lines used in window washing.

To simplify the following discussion and explanation, reference to the underlying support structure will be limited to upper perimeter 40 of a pickup truck 50 cargo or truck box 46. It would be readily apparent, however, to one skilled in the art that this invention may be used on a wide variety of support surfaces. The claimed invention is not restricted to use upon a specific support structure or within a specific environment.

The primary and universal elements of the present invention comprise: an elongated bar rail 52; an elongated rack or ratchet strip 54; and means for securing 56 the invention to the underlying support structure.

ELONGATED ACCESSORY BAR RAIL

Elongated accessory bar rail 52 serves as a protective member and primary load bearing structure of the invention. As seen in FIG. 1, bar rail 52 is placed around upper perimeter 40 of side walls 42 and tailgate 44 of pickup truck 50. One or more of a wide variety of accessories can be removably and adjustably attached, snapped, or clamped to the universal, low profile, accessory bar rail 52. When attached, the present invention offers a utility truck owner increased hauling versatility in addition to damage protection to the upper surfaces of truck box 46 and tailgate 44.

In the preferred embodiment, accessory bar rail 52 comprises a solid bar of one-half-inch ($\frac{1}{2}$") thick, two-inch (2") wide stainless steel solid bar having any appropriately desired length. Stainless steel material is preferred because of its hardness, durability, and resistance to rust. Other materials and sizes may also be used, depending upon the required strength of the material and the environment where the invention will be used. When appropriately attached as set forth below, bar rail 52 provides a smooth, sleek, aesthetically pleasing look to the invention, which can be stepped upon, sat upon, and used without sacrificing comfort or safety.

ELONGATED RATCHET STRIP

Ratchet strip 54 comprises an elongated rack which has outwardly extending gears or teeth 58. In the preferred embodiment, teeth 58 are provided on both sides of ratchet strip 54. This provides the invention with greater versatility and ability to restrict longitudinal movement of an accessory with respect to bar rail 52. The present invention, however, may be practiced with only one side of ratchet strip 54, or a portion of one side of ratchet strip 54, having outwardly extending teeth 58.

Ratchet strip 54 may be made of any suitable material. In the preferred embodiment, ratchet strip 54 is made of an ABS plastic which is durable, is easily machined, and will not mar the vehicle to which it is attached. Alternatively, other materials such as composite plastic or metal, including stainless steel, may be used.

Teeth 58 of ratchet strip 54 may be generally rectangular, trapezoidal, triangular, or even round or oval. The primary feature and function of ratchet strip 54 is to prevent any accessory which is clamped thereto from moving longitudinally with respect to bar rail 52.

Figure 2:
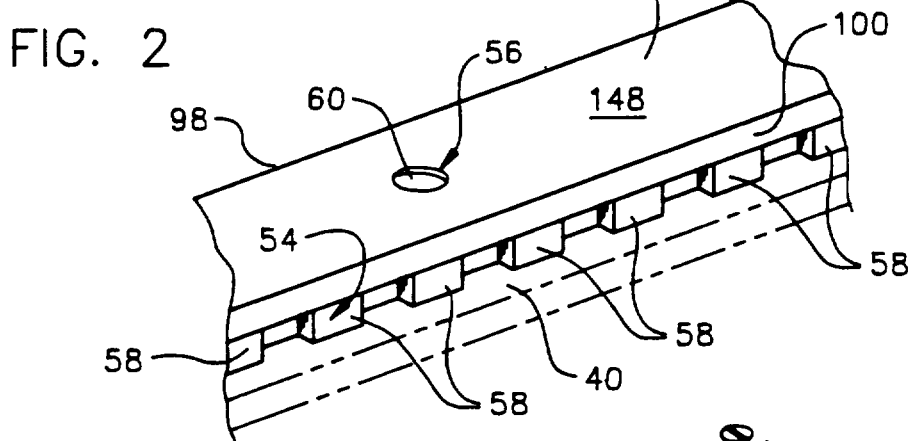
FIG. 2 is an enlarged, partial, isometric view of a portion of the elongated bar rail, ratchet strip, and truck-box side wall shown in FIG. 1.

During use, ratchet strip 54 is juxtaposed between bar rail 52 and upper perimeter 40 of side walls 42 and tailgate 44. As seen in FIG. 2, once bar rail 52 is placed upon ratchet strip 54, ratchet strip 54 is generally hidden and protected beneath elongated bar rail 52. Thus positioned, teeth 58 of ratchet strip 54 are protected from rubbing or impacting against the cargo or against the cargo handlers.

In addition to performing its primary function of restricting the movement of attached accessories, ratchet strip 54 cushions any downward blow which bar rail 52 may suffer. Ratchet strip 54 also supports bar rail 52 against torsional movement and rolling, distributing the load or torsional forces over a larger area.

SECURING MEANS

Figure 3:
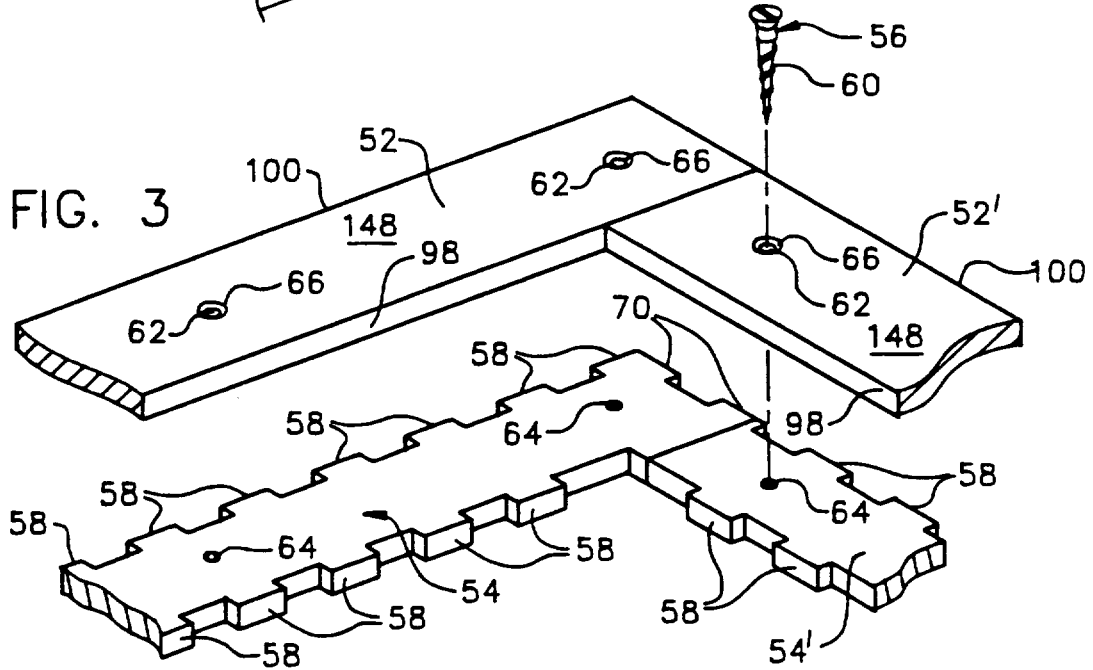
FIG. 3 is a partially sectioned, exploded, isometric view of a corner portion of the invention illustrating the interrelationship between the elongated bar rails, ratchet strips, and means for securing the invention to an underlying support structure.

Means for securing 56 bar rail 52 and ratchet strip 54 to side walls 42 and tailgate 44 is also provided. In the preferred embodiment, bar rail 52 and ratchet strip 54 are permanently installed to the support structure. Securing means 56 comprises stainless steel flat head screws 60 or through bolts which are placed on five-inch (5") to seven-inch (7") centers. As shown in FIG. 3, holes 62 and 64 are provided within bar rail 52 and ratchet strip 54, respectively, to allow for through passage of securing means 56. If flat head screws 60 are used, bar rail 52 may be provided with countersunk holes 66 to receive a screw head 68 and give a generally smooth streamlined appearance.

The present invention may be mounted over bed liners or other protective apparatus without difficulty or reduction in utility. If needed, spacers (not shown) between the ratchet strip 54 and the underlying support structure may also be used to provide escape of rain and water. Alternatively, a sealant (not shown) may be used between each element or component to prevent the entrance of liquid therebetween.

Other means for securing 56 bar rail 52 and ratchet strip 54 to the support structure may also be used. For example, depending upon the environment where the present invention is used, adhesives, welds, nails, Velcro hook and loop fasteners, and the like, may serve as securing means 56.

As shown in FIG. 3, intersecting bar rails 52 and 52' and intersecting ratchet strips 54 and 54' may be simply cut to length and installed adjacent to one another. In the preferred embodiment, however, one of the abutting ratchet strips 54 is provided with end teeth 70 which match or correspond with teeth 58 of adjacent ratchet strip 54'

ACCESSORIES

As seen in FIGS. 4 through 34, one or more of a large variety of accessories may be used with the present invention. Each of the illustrated accessories will now be described.

(A) SIMPLE TIE DOWN SLIP

FIGS. 4 through 8 and 24 through 26 illustrate various tie down clips which may be attached to the claimed bar rail 52 and ratchet strip 54. Some of these clips are more complex than others.

Use of the simplest clip is shown in FIGS. 24 through 26, wherein a simple hook clip 72 is passed over the edge of bar rail 52. Hook clip 72 has one or more inwardly projecting clip teeth 74 which engage ratchet strip 54 between adjacent teeth 58. Ratchet strip 54 prevents hook clip 72 from moving longitudinally with respect to bar rail 52. Hook flange 76 and clip teeth 74 prevent hook clip 72 from moving transversely with respect to bar rail 52, at least in one direction.

Tension placed upon hook clip 72 by a cargo net 78, tonneau cover 80 or tarp, rope 82, chord, or the like, further restricts the movement of hook clip 72. For example, hook clip 72 may be attached to cargo net 78 or cover 80, by passing rope 82, a chord, fastener, or similar element, through a rolled eyelet 84 formed at one end of hook clip 72 at an opposite location to that of hook flange 76 and clip teeth 74.

Another embodiment of a simple tie down clip 86 is illustrated in FIGS. 7 and 8, wherein a piece of flat molded plastic or bent metal is configured to form one or more hooked flanges 76' and clip teeth 74' which engage an edge of bar rail 52 and one or more spaces between adjacent teeth 58 of ratchet strip 54. A portion of tie down clip 86 may be provided with a flange 88 having eyelet 90 located therein. A rivet 92 or similar device may be passed through eyelet 90 to secure cover 80 to tie down clip 86. For example, as seen in FIGS. 7 and 8, tie down clip 86 may have a centrally-located, outwardly-extending center flange 88. Flange 88 has a hole or eyelet 90 therethrough for receipt of rivet 92. The depicted configuration causes rain and moisture to run off of cover 80 and pass beyond and below upper perimeter 40 of truck box 46, thereby, preventing moisture from entering into the cargo area.

(B) SPRING BIASED TIE DOWN CLIP

As shown in FIGS. 4 through 6, a simple tie down clip may be modified by providing one end thereof with a spring flange 94. Hooked flange 76' and clip teeth 74' of spring clip 96 engage bar rail 52 in a similar manner as described above. An opposite end of spring clip 96, however, is bent toward bar rail 52 and ratchet strip 54 to releasably engage a second, opposing, opposite edge of bar rail 52. Once hooked flange 76' is properly placed upon a first edge 100 of bar rail 52, a downward force of sufficient magnitude to overcome the spring forces within spring clip 96 will urge spring flange 94 outwardly to pass over second edge 98. Spring flange 94 then retracts to secure spring clip 96 to bar rail 52. Removal of spring clip 96 is achieved by reversing this process. When in position, spring flange 94 urges proper engagement of hooked flange 76' and clip teeth 74' onto bar rail 52 and between teeth 58 respectively.

An anchor 102 comprising an outwardly extending hook may be formed within or welded onto spring clip 96. Proper usage of such spring clips 96 will be readily apparent to one skilled in the art.

(C) HEAVY DUTY TIE DOWN RING AND CLAMP

Referring to FIGS. 9 and 10, two separate hook clips may be combined to form a secure, reliable clamp 104 to which a tie down ring 106 may be attached. As shown, clamp 104 comprises: a lower hook clip 108; an upper hook clip 110; a threaded bolt 112; and a tie down ring 106 having a threaded bore 114.

A base 116 of lower hook clip 108 is provided with a countersunk hole or groove 118 immediately adjacent to a through bore or hole 120. Alternatively, lower hook clip 108 may have a spacer 122 or washer strip which is juxtaposed between lower hook clip 108 and bar rail 52. Spacer 122 may then have countersunk groove 118 provided therein.

Threaded bolt 112 is inverted so that its threaded shank 124 is projecting upwardly, and shank 124 is inserted through hole 120 in lower hook clip 108. A head 126 of bolt 112 is seated flush within countersunk groove 118.

Lower hook clip 108 and bolt 112 are passed over bar rail 52 to engage first edge 100 or second edge 98 of bar rail 52. As shown in FIG. 10, clip teeth 74' are positioned between one or more adjacent teeth 58 of ratchet strip 54.

Base 127 of upper hook clip 110 is similarly provided with a through bore or hole 128. Hole 128, however, is enlarged to receive a lower ridge 130 of tie down ring 106.

To enable upper hook clip 110 to pass over the upwardly extending bolt 112, once hooked flange 76" has engaged bar rail 52, a groove, slot or oval cutout 132 is provided within a base 127 of upper hook clip 110. Base 127 of upper hook clip 110 rests and is juxtaposed against base 116 of lower hook clip 108.

A machined or molded tie down ring 106 is then placed over threaded shank 124 of bolt 112. Tie down ring 106 has a threaded bore 114 extending upwardly through its base 138 which receives and engages shank 124.

As tie down ring 106 is rotated onto bolt 112, lower ridge 130 of tie down ring 106 seats within hole 128, thereby forcing upper hook clip 110 to tightly grip and engage bar rail 52 between one or more adjacent teeth 58 of ratchet strip 54.

It is important to note that the length of hook flanges 76' and 76" on lower and upper hook clips 108 and 110, respectively, will be slightly different. Hook flanges 76' and 76" must have a sufficient length and hook distance to properly engage bar rail 52 without excessive slack.

This embodiment provides an extremely heavy duty tie down ring 106 and clamp 104 accessory, the removal of which requires a reversal of the above-specified procedure.

(D) CARGO NET

As explained above and illustrated in FIG. 24, the present invention may be used to secure cargo net 78 to upper perimeter 40 of truck box 46 and tailgate 44. Typically, cargo nets 78 are made of an elastic cord web that may be secured in place by the use of simple hook clips 72, as shown in FIGS. 25 and 26.

(E) TONNEAU COVER

As has been explained above, the present invention accommodates the attachment of tonneau cover 80 to bar rails 52 and ratchet strips 54. Attachment of cover 80 is illustrated in FIGS. 7 and 8. In the preferred embodiment, the tie down clips 86 are made from stamped metal and are placed on four-inch (4") to six-inch (6") centers.

Truck bed tonneau covers 80 may be premanufactured to fit an array of truck box 46 sizes. Covers 80 may be made of vinyl, canvas, nylon, or other flexible material.

The extendable cargo holder bars 140, which will be discussed further below, may also be placed under cover 80 to engage bar rails 52 and ratchet strips 54 of the present invention. Thus positioned, cargo holder bars 140 support cover 80 and prevent the weight of rain and snow from stretching the material of cover 80.

The accessories thus far mentioned are easily placed and carried within an interior of the truck cab 188 and may be used as the occasion requires. More elaborate and complex accessories will now be discussed.

(F) EXTENDABLE CARGO HOLDER BAR

Figure 12:
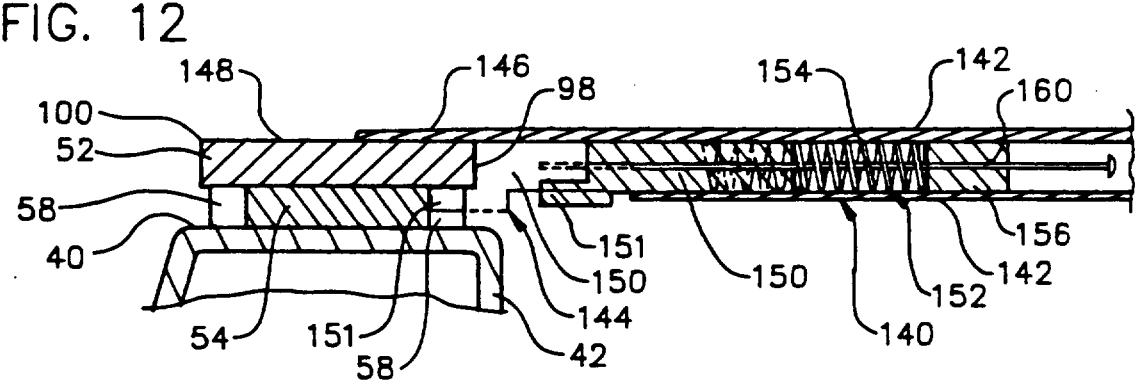
FIG. 12 is a partial, cross-sectional, side-elevational view of the cargo holder bar as viewed along line 12—12 of FIG. 11.

Referring to FIGS. 11 and 12, extendable cargo holder bar 140 may be used to keep ridged loads from shifting from the front to the back of cargo bed 48. This is accomplished by placing cargo holder bar 140 between two sets of spaced, generally parallel bar rails 52 and ratchet strips 54. Preferably, bar rails 52 are fixed to upper perimeter 40 of opposite side walls 42 of truck box 46, as shown in FIG. 1. Cargo holder bar 140 of the preferred embodiment, comprises: an outer, weight bearing, tubular sleeve 142; and means for restricting longitudinal movement 144 with respect to bar rail 52.

As seen in FIG. 12, an upper flange 146 of outer tubular sleeve 142 extends across the span between the two side walls 42 of truck box 46 to rest upon an upper surface 148 of bar rail 52. Upper flange 146 is preferably tapered to provide a relatively smooth transition been upper surface 148 of bar rail 52 and upper flange 146 of outer tubular sleeve 142. Thus positioned, outer tubular sleeve 142 will support a weight placed thereupon.

Restricting means 144 is provided to restrict longitudinal movement of cargo holder bar 140 with respect to bar rail 52. In the preferred embodiment, restricting means 144 comprises: an extendable and retractable plunger 150 having one or more outwardly extending teeth 151; and means for urging 152 plunger 150 outwardly so that teeth 151 engage between adjacent teeth 58 of ratchet strips 54. Plunger 150 may be located at one or both ends of cargo holder bar 140 and is positioned telescopically within outer tubular sleeve 142.

Urging means 152 may comprise a compression spring 154 located within the interior of outer tubular sleeve 142. Compression spring 154 is braced between a rigid plug 156 and an inner end 158 of movable plunger 150.

A directional rod 160 may be used to properly align plunger 150 and compression spring 154 within outer tubular sleeve 142.

When plunger 150 is placed against and tangential to bar rail 52, compression spring 154 urges teeth 151 of plunger 150 to engage between teeth 58 of ratchet strip 54. Thus positioned, compression spring 154 urges plunger 150 outwardly and the intermeshing of teeth 151 and teeth 58 prevent longitudinal movement of cargo holder bar 140 with respect to bar rail 52.

In an even further embodiment, another bar rail and ratchet strip (not shown) may be secured longitudinally to an upper or lower flange of outer tubular sleeve 142. This allows for additional hold down clip arrangement.

(G) LOW RACK SUPPORT SYSTEM

Figure 13:
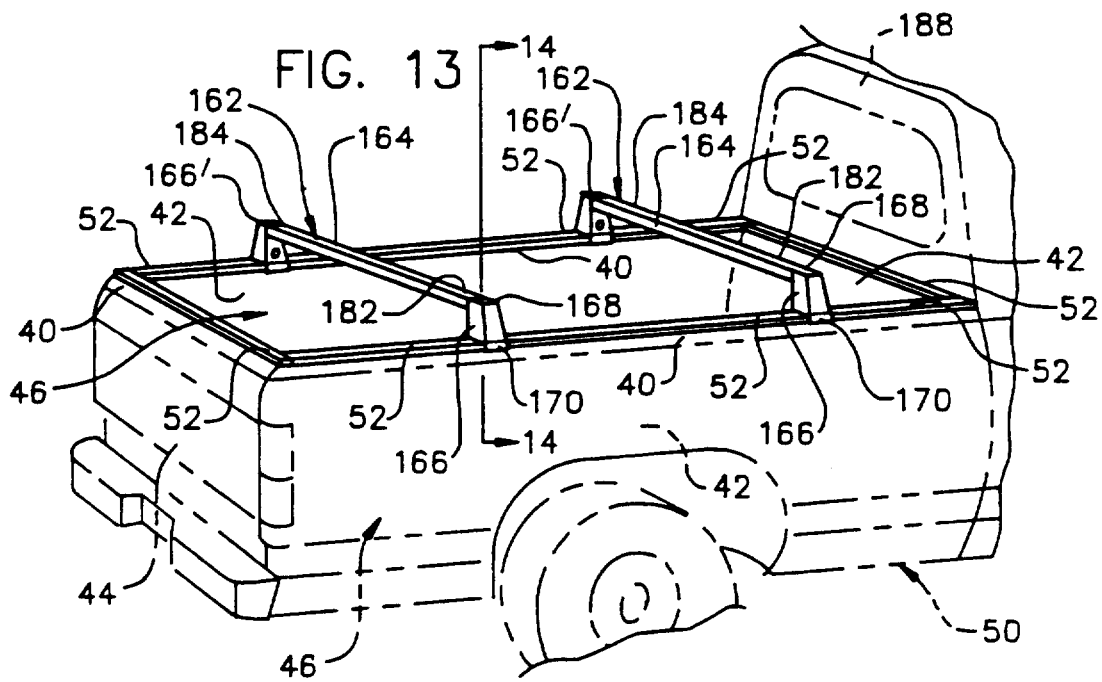
FIG. 13 is a schematic view of a low rack support system secured to the bar rails and ratchet strips of the present invention.
Figure 14:
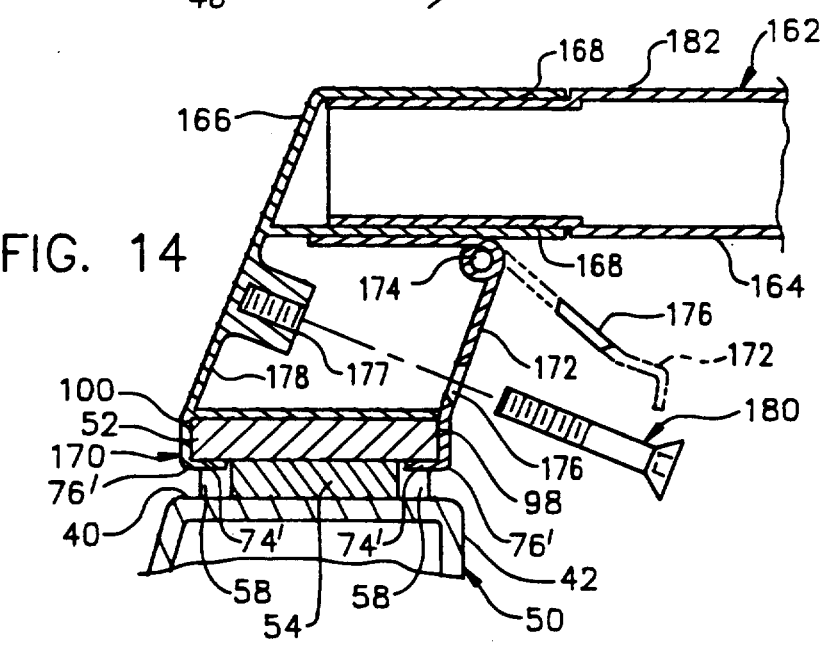
FIG. 14 is a partial, cross-sectional, side-elevational view of the low rack support system as seen along line 14—14 of FIG. 13.

Referring to FIGS. 13 and 14, a low rack support system 162 may be used to support ski racks, bicycle racks, snow boards, sail boards, lumber, and other devices. If needed one, two, three, or more low rack support systems 162 may be used on the present invention.

Low rack support system 162 clamps onto bar rails 52 and ratchet strips 54 located on upper perimeter 40 of each side wall 42 of truck box 46. More particularly, low rack support system 162 comprises: a central span bar 164 or support rod; and two end caps 166 which clamp onto bar rails 52.

Central span bar 164 may comprise either a solid or hollow member. In the preferred embodiment, central span bar 164 is made of one-inch (1") square stainless steel tubing. The cross-sectional area of each end of span bar 164 is slightly reduced so that each end will fit snugly into a sleeve 168 located in each end cap 166.

Each end cap 166 is provided with a sleeve 168 into which is received and retained one end of span bar 164. End cap 166 also has an outer hook clip 170. Outer hook clip 170 has a hooked flange 76' and clip teeth 74' which engage an outer edge 100 of bar rail 52. Clip teeth 74' intermesh and engage the outwardly extending teeth 58 of ratchet strip 54.

End cap 166 also has an inner, hinged, hook clamp 172 which rotates about a pivot point 174 to engage the inner or second edge 98 of bar rail 52. Hinged hook clamp 172 has a hooked flange 76' and clip teeth 74' which engage an inner edge 98 of bar rail 52. Clip teeth 74' intermesh and engage the outwardly extending teeth 58 of ratchet strip 54. Hinged hook clamp 172 may also be provided with a countersunk hole 176 therein. A threaded bore or nut 177 is formed integrally within or attached to an interior surface 178 of end cap 166.

To secure inner hinged hook clamp 172 in place a threaded hex bolt 180, or other type of fastener which is not easily removed without proper tools, is passed through countersunk hole 176 located within hinged hook clamp 172. Bolt 180 is then threaded into threaded bore or nut 177. Tightening of bolt 180 forces hinged hook clamp 172 into tight engagement with inner edges 98 of bar rail 52.

After one end cap 166 is secured in place, a first end 182 of span bar 164 is slid or inserted into receiving sleeve 168 of that end cap 166. A second end cap 166' is then placed into a position so that a second end 184 of span bar 164 is received into a receiving sleeve 168 of second end cap 166'. Simultaneously, outer hook clip 170 of second end cap 166' engages outer edge 100 of the opposite bar rail 52.

Hinged hook clamp 172 of second end cap 166' is then pivoted into position and held in place by the insertion and tightening of a threaded bolt 180.

This embodiment has particularly smooth lines, due to countersunk hole 176 being located in the inner hinged hook clamp 172 wherein bolts 180 lay flat and coplanar with hinged hook clamp 172.

Removal of low rack support system 162 can only be accomplished by a reversal of the above-listed steps.

(H) RAISED RACK SUPPORT SYSTEM

Referring to FIGS. 15 through 17, use of a raised rack support system 186 enables a load (not shown) to be raised over and extend past a cab 188 of truck 50. Thus, raised rack support system 186 is ideal to transport longer objects such as wind surfers, surf boards, canoes, utility boats, plywood, lumber, and the like. If needed one, two, three, or more raised rack support systems 186 may be used. Again, the design of raised rack support system 186 is uncluttered, sleek, and aesthetically appealing.

Raised rack support system 186 clamps onto bar rails 52 and ratchet strips 54 located on each side wall 42 of truck box 46. More particularly, raised rack support system 186 comprises: a central span bar 164 or support rod; two elongated end caps 192; and means to secure 194 elongated end caps 192 to span bar 164, and to bar rails 52.

In the preferred embodiment, central span bar 164 of raised rack support system 186 is identical to central span bar 164 used in low rack support system 162. This enables interchangeability of parts and reduces the number of parts that need to be manufactured to practice the invention in its entirety.

Again, the cross-sectional area of the first and second ends 182 and 184 of span bar 164 is slightly reduced to fit snugly into sleeve 168 located on an upper portion 196 of elongated end cap 192. This may be accomplished by using a hollow, square tube for the central length of span bar 164, and then inserting a single, outwardly-extending, solid plug 198 into each end 182 and 184 of the tube. Solid plug 198 is then inserted into sleeve 168 of elongated end cap 192 and secured in place.

As shown in FIG. 16, sleeve 168 of end cap 192 has a hole 200 located therein. Solid plug 198 is provided with an aligned threaded bore 202. A threaded, compression, hex bolt 204 passes through hole 200 in sleeve 168, enters threaded bore 202, and securely engages solid plug 198. Bolt 204 prevents the removal of solid plug 198 from sleeve 168 in end cap 192. A washer 206 may be placed between a head 208 of bolt 204 and sleeve 168.

It will be apparent to one skilled in the art that other types of span bars 164 could be used to achieve the purposes set forth herein. For example, the entire span bar 164 may have a uniform cross-sectional area which enables a solid bar or hollow tube to be inserted into sleeve 168 of end caps 192 without requiring modification. The streamlined appearance of raised rack support system 186, however, may be affected.

As shown in FIG. 16, sleeve 168 of end cap 192 is integrally or fixedly secured to an elongated support brace 210 which in turn is fixedly secured to a simple, outer hook clip 212. Outer hook clip 212 has a hooked flange 76' and clip teeth 74' as explained above. When used, outer hook clip 212 engages outer edge 100 of bar rail 52 and clip teeth 74' intermesh and engage teeth 58 of ratchet strip 54.

One or more threaded bores 214 are provided near a lower end 216 of elongated support brace 210 to facilitate attachment of a second hook clamp 218 thereto. Second hook clamp 218 has a hooked flange 76' and clip teeth 74'. Second hook clamp 218 also has one or more holes 220 located therein. When second hook clamp 218 is secured in place, holes 220 are aligned with threaded bores 214 of elongated support brace 210.

Second hook clamp 218 is configured to engage inner edges 98 of bar rail 52. As explained above, hooked flange 76' and clip teeth 74' intermesh and engage between teeth 58 of ratchet strip 54. A base 222 of second hook clamp 218 passes over a portion of outer hook clip 212, and holes 220 become aligned with threaded bores 214 of support brace 210. One or more threaded, compression, hex bolts 224 pass through holes 220 in second hook clamp 218 to securely engage support brace 210. Bolts 224 secure and clamp outer hook clip 212 and second hook clamp 218 together. A washer 226 may be placed between bolts 224 and second hook clamp 218. FIG. 17 illustrates the use of two compression bolts 224.

(I) CANTILEVERED, LONG LOAD, OVER CAB, RACK SUPPORT SYSTEM

The following accessory is intended to be attached to an upper end 196 and sleeve 168 of elongated support brace 210 described above. A cantilevered rack support system 230 comprises: an elongated rack 232 having an L-shaped cross section; and a facia member 234 or side beam having a generally C-shaped cross section.

Facia member 234 is secured to L-shaped elongated rack 232 by welding, use of adhesives, or use of fasteners.

Slots or cutouts are provided in a lower flange 236 of facia member 234 to accommodate the placement of cantilevered rack support system 230 against raised rack support system 186.

Threaded, compression, hex bolt 204 which secures span bar 164 to the upper sleeve 168 of end cap 192 may be used to secure cantilevered rack support system 230 to the upper sleeve 168 of elongated support brace 210. As seen in FIG. 20, a lower flange 238 of elongated rack 232 is provided with a hole through which a shank 240 of compression bolt 204 may pass.

The weight of cantilevered rack support system 230 may be reduced by removing central portions of facia member 234 and central portions of elongated rack 232, as is commonly practiced in the industry. Typically, holes 242 are formed or drilled in facia member 234 and elongated rack 232 to accomplish this purpose. Holes 242 also provide additional means whereby rope, cord, or the like may be secured to cantilevered rack support system 230.

For aesthetic reasons, a forward portion 244 of cantilevered rack support system 230 may be tapered as shown in FIG. 18.

An additional span bar 246 may also be provided near the front of elongated rack 232 to further stabilize the structure.

Before moving to even more accessories that can be used with the present invention, it is important to note that a user may have a variety of rack support systems pre-mounted to their respective central span bars. This would enable a user to easily change from one rack support system to another in a matter of minutes.

(J) CANOPY

Referring to FIGS. 21 through 23, a standard canopy 248 which is well known in the art may be easily secured to truck 50 using the present invention. FIG. 21 illustrates such a canopy 248 attached to the present invention.

Typically, canopies 248 have a lower, generally horizontal flange 250 which rests upon upper perimeter 40 of truck box 46. Holes 252 are provided within lower horizontal flange 250 to accommodate the placement of bolts 254 therethrough.

Attachment of canopy 248 to bar rails 52 and ratchet strips 54 is accomplished by using one or more hook clips or canopy rails.

Referring to FIG. 23, a front wall 256 of canopy 248 and associated lower flange 250 are secured to bar rail 52 and ratchet strip 54 by using a hook clip 258 which resembles lower hook clip 108 of clamp 104. Hook clip 258 may comprise a single clip, a plurality of clips, or an elongated continuous clip which stretches the full length of the front of truck box 46.

Hook clip 258 has hooked flange 76' and clip teeth 74' similar to the other clips described above. Hooked flange 76' of hook clip 258 engages an inner 98 edge of bar rail 52. In other words, hook clip 258 engages the inner edge 98 of bar rail 52 which faces the interior cargo area of truck box 46. Clip teeth 74' intermesh and engage inner teeth 58 of ratchet strip 54.

Hook clip 258 may also be provided with an outwardly extending flange 260 which extends past front wall 256 of canopy 248 to direct rain and runoff away from the invention.

In operation, an upper surface 262 of hook clip 258 is juxtaposed against a lower surface 264 of lower flange 250. A shank 266 of threaded compression bolt 254 is passed upwardly through aligned holes 270 located in hook clip 258 and holes 252 located in lower flange 250. A washer 272 and threaded nut 274 are then secured to shank 266.

Once bolt 254 and nut 274 are tightened, front wall 256 of canopy 248 is urged into position with hooked flange 76' of hook clip 258 engaging inner edge 98 of bar rail 52. Thus positioned, hook clip 258 prevents canopy 248 from moving toward cab 188 and prevents front wall 256 from sliding from side to side.

A similar hook clip 276 is secured to lower flanges 250 of side walls 278 of canopy 248. However, hooked flanges 76' of hook clip 276 engage the outer edges 100 of bar rail 52. Rain flange 260 is not needed or used.

Instead of securing shank 266 of compression bolt 254 to nut 274, shank 266 is secured to an L-shaped bracket 280, as shown in FIG. 22. L-shaped bracket 280 may comprise a single bracket, a plurality of brackets located at different positions along the length of side wall 42, or be an elongated continuous clip which stretches generally the full length of the side of truck box 46.

A second hook clamp 282, similar to second hook clamp 218 shown in FIG. 16, is attached to inner edge 98 of bar rail 52. Similarly, hooked flange 76' and clip teeth 74' intermesh and engage teeth 58 of the inner edge 98 of ratchet strip 54.

After gripping bar rail 52, second hook clamp 282 passes up past bar rail 52, first hook clip 276, and horizontal lower flange 250 to become aligned with a threaded bore 284 provided in a generally vertical flange 286 of L-shaped bracket 280. One or more threaded, compression bolts 288 are passed through holes 290 located in second hook clamp 282 to engage a threaded bore 284 located in vertical flange 286. A washer 294 may be placed between a bolt head 296 and second hook clamp 282.

Due to the wide variety of canopy designs which are currently manufactured, several differently configured second hook clamps 282 may have to be produced.

Once bolts 254 and 288 are tightened, side walls 278 of canopy 248, lower hook clip 276, and second hook clamp 282 are clamped securely to bar rail 52. Thus positioned, side walls 278 of canopy 248 are prevented from moving in all directions.

As shown in FIGS. 22 and 23, a durable, soft sealing material 298 may be juxtaposed between the various hook clips and bar rails 52. Sealing material 298 may be made of an adhesive material to keep moisture and water from entering the cargo area of cargo bed 48. Sealing material 298 also provides clearance for bolt 254 or screw heads.

In summary, this accessory is designed so that canopy 248 could be set on side bar rails 52 about six-inches (6") short of the front of truck box 46. Canopy 248 is then pushed forward into place. Once in place, approximately four hold down, second hook clamps 282 having an average length of about two-and-one-half-inches (2 ½") are secured to vertical flange 286 of L-shaped bracket 280 and to inner edges 98 of bar rails 52. Once bolts 288 are tightened, canopy 248 is secured in place.

(K) VERTICAL POSTS AND HORIZONTAL BOX BOARDS

Reference will now be made to FIGS. 27 through 34, which illustrate various features and apparatus for securing side rails or box boards 300 to truck box 46 and/or to tailgate 44. This accessory converts a standard truck box 46 or flat bed truck or trailer (not shown) to a stake side box for increased capacity and versatility. FIGS. 27 and 28 show schematic views of how box boards 300 are secured to truck 50.

FIG. 29 is an exploded isometric view of a generally vertical, front-corner post 302 fixed to a front-corner hook clip 304, and showing in phantom lines how a front-corner retainer clip 306 is positioned for use.

Front-corner, side, and end posts, 302, 308 and 310 respectively, may be made of any suitable material. However, in the preferred embodiment, posts 302, 308 and 310 are made of two-inch (2") square tubular piping having an end cap 312 located on their upper end 314. Alternatively, a solid bar could be used for corner, side and end posts 302, 308 and 310.

Front, side, and end posts 302, 308, 310 are secured to corresponding corner, side, and end hook clips 304, 316 and 318 respectively. FIG. 30 illustrates in phantom lines the configuration of clip teeth 74' of corner hook clip 304 and corner retainer clip 306. Clip teeth 74' are positioned diagonally to enable corner hook clip 304 and corner retainer clip 306 to be slid into position from a generally forty-five (45) degree angle with respect to either the front or side walls 42 of truck box 46. Not very much clearance is required, only enough clearance to enable clip teeth 74' to pass over bar rail 52 and engage teeth 58 of ratchet strip 54.

Similarly, FIG. 32 illustrates in phantom lines the configuration of clip teeth 74' of side hook clip 316 and side retainer clip 320.

Figure 34:
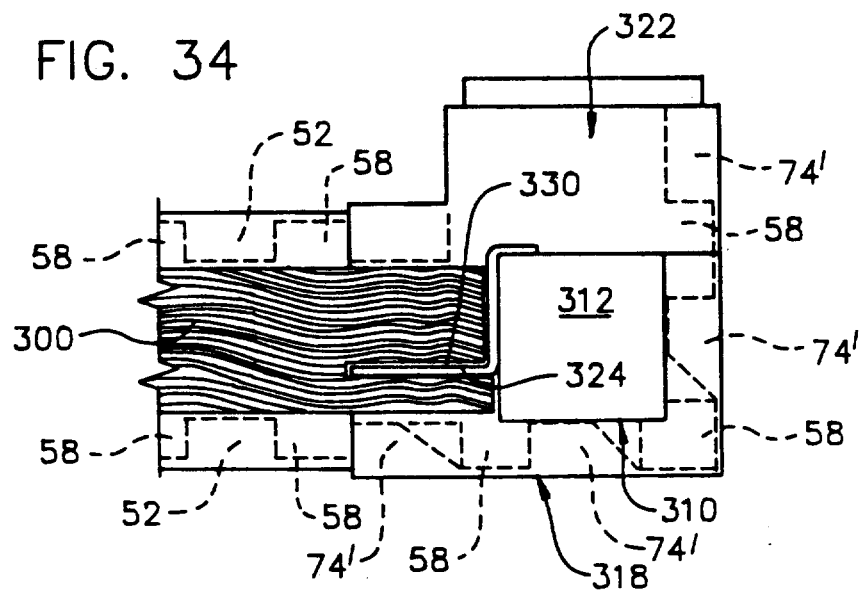
FIG. 34 is a plan view of the rear corner post and rear corner retainer clip shown in FIG. 33 secured to a bar rail, ratchet strip, and side boards.

FIG. 34 illustrates in phantom lines the configuration of clip teeth 74' of end hook clip 318 and end retainer clip 322.

Each corner, side and end post 302, 308, and 310 is provided with one or more flanges 324 which project outwardly therefrom. Flanges 324 are located within a plane generally tangential to an upper surface of bar rail 52 which is positioned immediately therebelow. Flanges 324 are also directed outwardly in a similar longitudinal direction as defined by bar rail 52 positioned therebelow. Flanges 324 preferably extend from a central area of each post. One or more holes 326 may be provided within each flange 324.

Retainer clips 306, 320, and 322 are configured to engage the opposite edge 98 of bar rail 52. Each retainer clip 306, 320, and 322 is also provided with one or more flanges 328 which correspond respectively to flanges 324 of posts 302, 308, 310. When positioned against its corresponding post, flanges 328 of each retainer clip 306, 320, and 322 fall within the same plane as flanges 324 of posts 302, 308, and 310, respectively. Flanges 328 may also be provided with holes 329 located therein.

Side rails or box boards 300 having a length which spans the distance between successive posts are placed between each successive post. Each box board 300 has a kerf 330 cut into the end thereof. Consequently, box boards 300 may slip over and engage the outwardly extending flanges 324 of posts 302, 30B, and 310 and flanges 328 of retainer clips 306, 320, and 322.

If a box board 300 engages both flange 324 and flange 328, box board 300 secures the retainer clip into a fixed position. A screw, bolt, or pin (not shown) may pass through the side kerf 330 of box board 300 and pass through holes 326 and/or 329 to further secure box boards 300 to the post and retainer clip. This is particularly useful when box boards 300 are exposed to heavy use or rough roads.

Figure 33:
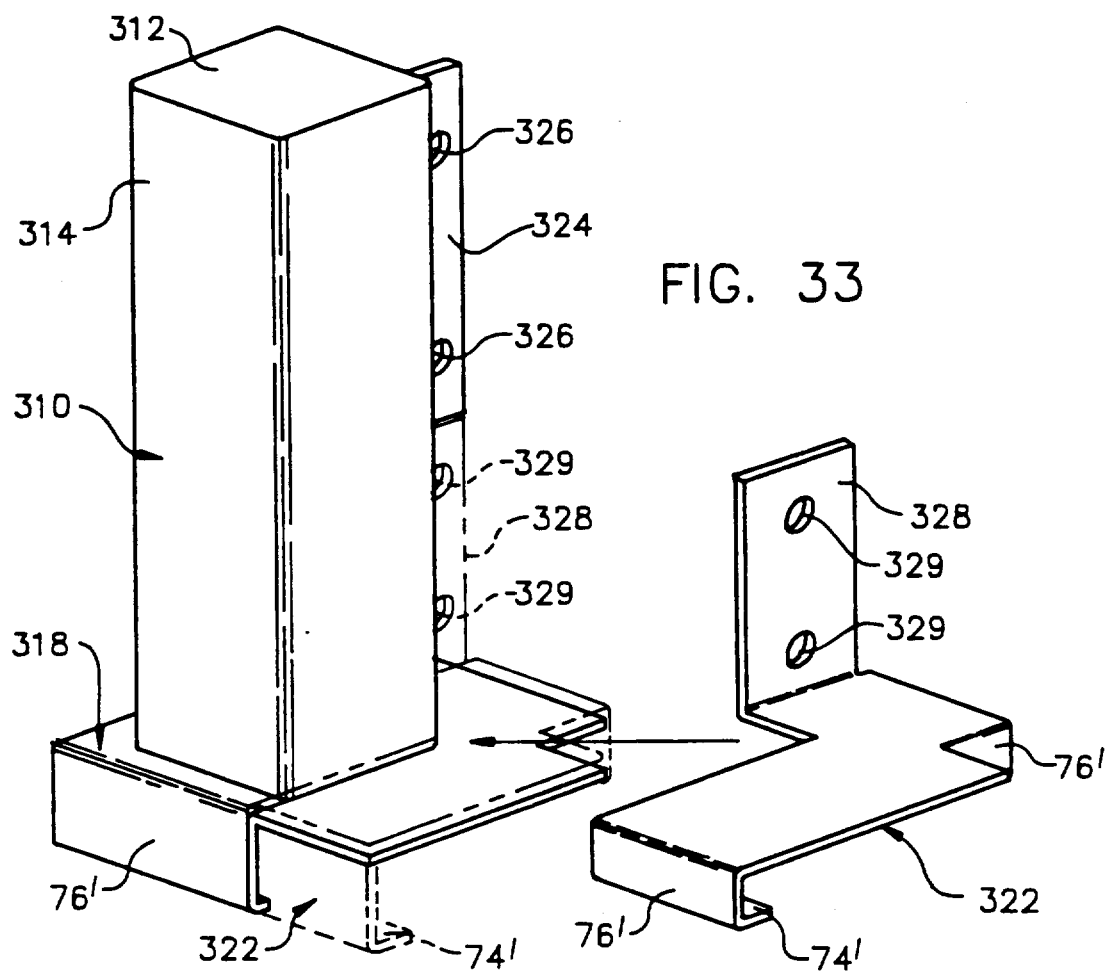
FIG. 33 is an exploded isometric view of a rear corner post and rear corner retainer clip.

If box boards 300 are not to be placed over tailgate 44, end posts 310 and end retainer clips 322, which have respective flanges 324 and 328 that are directed only along one side wall 42 of truck 50, be can be used. One end post 310 and end retainer clip 322 are shown in FIGS. 33 and 34.

METHOD OF USE

Various methods for practicing the invention have already been explained in detail above. However, in review, the following basic steps are used: (a) juxtaposing an elongated ratchet strip 54 having a plurality of outwardly extending teeth 58 between a support structure and an elongated bar rail 52; and (b) securing the bar rail 52 and the ratchet strip 54 to the support structure. Additional steps include: securing a simple tie down clip 72; a spring biased tie down clip 96; a heavy duty tie down ring and clamp 106 and 104; a cargo net 78; a tonneau cover 80; an extendable cargo holder bar 140; a low rack support system 162; a raised rack support system 186; a cantilevered, long load, over cab, rack support system 230; a canopy 248; or vertical posts 302, 308, and 310, retainer clips 306, 320, and 322, and box boards 300 to bar rail 52 and ratchet strip 54.

Due to its sleek configuration and ability to engage bar strip 52 and ratchet strip 54 at a multitude of locations, the present invention may be used very effectively where operational access is limited. Because teeth 58 of ratchet strip 54 and clip teeth 74' of every accessory are hidden beneath bar strip 52, damage to cargo and cargo handlers is virtually eliminated for such elements.

The means and construction disclosed herein are by way of example and comprise primarily the preferred forms of putting the invention into effect. Although the drawings depict preferred and alternative embodiments of the invention, other embodiments have been described within the preceding text. One skilled in the art will appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments which fall within the legitimate and valid scope of the appended claims, appropriately interpreted under the Doctrine of Equivalents.

INDUSTRIAL APPLICABILITY

The present invention may be used within a wide variety of industries, wherein simple, reliable, easily used apparatus and methods are needed to adjustably secure a wide variety of accessories to a support structure. The apparatus of this invention is compact, functional, unobtrusive, efficient, reusable, durable, rugged, is easily constructed, and is inexpensive and economical to manufacture.

Traditional or nontraditional cargo holding devices may be used. All racks, covers, clips, and other devices are clamped, snapped, or otherwise secured to the invention, and no other holes or bolts need be used. Such accessories may be added to or removed from the device as the need requires.

The present invention not only increases the speed and simplifies the procedure to secure such devices to the support structure, it also: provides a protective surface for the elongated ratchet strip and for the support structure; provides a universal means for obtaining nearly continuous location adjustment for such devices; requires less access room for operation; and significantly reduces if not eliminates damage to adjacent cargo and injury to cargo handlers.

Although the invention has a wide range of applications, the invention has special application in the automotive, storage, and maritime industries, wherein a wide variety of cargo holding devices need to be adjustably secured to an underlying support structure. For example, the apparatus has an extremely low profile and may be used on commercial, recreational, or cargo hauling vehicles. The present invention permits such securement to be accomplished in areas of extremely limited access. Once the elongated bar rail and ratchet strip are attached to the support structure, cargo holding devices may be secured thereto at nearly any location along its length.

What is claimed is:

1. An apparatus for securing a load to a support structure, comprising:
    (a) an elongated bar rail having a longitudinal axis;
    (b) an elongated ratchet strip having a longitudinal axis positioned substantially parallel to longitudinal axis of said bar rail, said ratchet strip having a plurality of longitudinally spaced, outwardly-extending teeth extending substantially perpendicularly outward from said longitudinal axis of said ratchet strip, said ratchet strip being juxtaposed between said bar rail and the support structure, said bar rail being a protective barrier for said ratchet strip, for said outwardly-extending teeth, and for the support structure, said teeth of said ratchet strip being substantially covered by said elongated bar rail;
    (c) means for securing said bar rail and said ratchet strip to the support structure, and
    (d) an accessory for security the load, said accessory removably and adjustably secured to said bar rail at one or more attachment locations along a length of said bar rail, said accessory having clip means, said clip means having a base and at least one hooked flange, said hooked flange hooking onto and contacting an edge of said bar rail such that said base is juxtaposed to said bar rail, said hooked flange having at least one inwardly projecting tooth which intermeshes with and engages between adjacent said outwardly extending teeth of said ratchet strip, engagement of said inwardly projecting tooth with adjacent said outwardly extending teeth restricting longitudinal movement of said accessory with respect to said longitudinal axis of said bar rail.

2. The apparatus of claim 1, wherein said clip means further comprises a spring flange, said spring flange releasably engaging a second edge of said bar jail.

3. The apparatus of claim 1, wherein said accessory comprises a heavy duty tie down ring and said clip means, said clip means further including:
    (a) lower clip means having a base and at least one hooked flange, said hooked flange of said lower clip means hooking onto and contacting a first edge of said bar rail such that said base of said lower clip means is juxtaposed to said bar rail, said hooked flange of said lower clip means having at least one said inwardly projecting tooth which intermeshes with and engages between adjacent said outwardly extending teeth of said ratchet strip, engagement of said inwardly projecting tooth of said lower clip means with adjacent said outwardly extending teeth restricting longitudinal movement of said lower clip means with respect to said longitudinal axis of said bar rail;
    (b) upper clip means having a base and at least one hooked flange, said hooked flange of said upper clip means hooking onto and contacting a second edge of said bar rail such that said base of said upper clip means is juxtaposed to said base of said lower clip means; and
    (c) a machined or molded tie down ring, said tie down ring being secured to said base of said upper clip means, said upper clip means being secured to said lower clip means to tightly grip or engage said bar rail.

4. The apparatus of claim 3, wherein said base of said lower clip means has a through bore or hole located therein, said base of said upper clip means having a through bore or hole located therein, and further comprising a threaded bolt having a head and a threaded shank, said shank capable of being inserted through said through bore or hole in said lower clip means and through said through bore or hole in said upper clip means prior to engagement with said bar rail.

5. The apparatus of claim 4, wherein said tie down ring has a threaded bore therein, said threaded bore receiving and engaging said shank of said bolt.

6. The apparatus of claim 5, wherein said tie down ring has a lower ridge, said through bore or hole of said upper clip means having sufficient size to receive said lower ridge of said tie down ring when said tie down ring is threaded onto said shank and juxtaposed to said base of said clip means, said lower ridge seating within said through bore or hole of said upper clip means and urging said upper clip means to tightly grip or engage said lower clip means and said bar rail.

7. The apparatus of claim 4, wherein said base of said lower clip means has a countersunk hole or groove positioned immediately about said through bore or hole, said head seating generally flush within said countersunk hole or groove in said lower clip means when said shank is inserted through said through bore or hole in said lower clip means.

8. The apparatus of claim 4, further comprising at least one space or washer strip juxtaposed between said lower clip means and said bar rail.

9. The apparatus of claim 8, wherein said space or washer strip has a hole therein, said space or washer strip being oriented to place said hole immediately about said through bore or hole in said lower clip means, said head seating generally flush within said hole in said spacer or washer strip when said shank is inserted through said through bore or hole in said lower clip means.

10. The apparatus of claim 1, wherein said accessory further comprises a cargo net, said cargo net having at least one said clip means attached thereto.

11. The apparatus of claim 10, wherein said cargo net comprises an elastic cord web.

12. The apparatus of claim 1, wherein said accessory further comprises a tonneau cover, said tonneau cover having at least one said clip means attached thereto.

13. The apparatus of claim 12, wherein said tonneau cover is made of a flexible vinyl, canvas, or nylon material.

14. The apparatus of claim 1, wherein said accessory further comprises at least one extendable cargo holder bar, said cargo holder bar having at least one said clip means attached thereto.

15. The apparatus of claim 14, wherein said cargo holder bar further comprises:
   (a) an elongated inner tubular sleeve;
   (b) an elongated outer tubular sleeve, said inner tubular sleeve being placed operatively within said outer tubular sleeve to enable telescopic extension therefrom.

16. The apparatus of claim 15, wherein said outer tubular sleeve further comprises an upper flange which is juxtaposed against and contacts an upper surface of said bar rail.

17. The apparatus of claim 16, wherein said upper flange is tapered from a thicker portion adjacent to said outer tubular sleeve to a thinner portion adjacent to said bar rail.

18. The apparatus of claim 16, wherein said cargo holder bar further comprise restricting means to restrict movement along said longitudinal axis of said bar rail, said restricting means having:
   (a) an extendable and retractable plunger having one or more teeth extending outwardly along a longitudinal axis of said cargo holder bar, said plunger being positioned telescopically within said outer tubular sleeve; and
   (b) means for urging said plunger outwardly from said cargo holder bar so that said teeth engage between adjacent said outwardly extending teeth of said ratchet strip.

19. The apparatus of claim 18, wherein said urging means comprises a compression spring located within an interior cavity of said outer tubular sleeve, said compression spring being braced between a rigid plug that is secured to said outer tubular sleeve, and an inner end of said plunger.

20. The apparatus of claim 19, wherein said cargo holder bar further comprises a directional rod secured to said outer tubular sleeve for guiding movement of said plunger and said compression spring within said outer tubular sleeve.

21. The apparatus of claim 1, wherein said accessory further comprises a rack support system having:
   (a) a span bar; and
   (b) at least one end cap, said end cap having a sleeve into which one end of said span bar is received and retained, said end cap also having said clip means thereon, said end cap further having an inner clip means which engages a second edge of said bar rail; and
   (c) means to secure said span bar to said end cap.

22. The apparatus of claim 21, wherein said rack support system further comprises a cantilevered, elongated rack secured to said end cap or to said span bar.

23. The apparatus of claim 22, wherein said elongated rack has an L-shaped cross-section, said rack support system further comprising an elongated facia member having a C-shaped cross-section, said facia member being attached to said rack such that said facia member and said rack share a similar longitudinal axis.

24. The apparatus of claim 1, wherein said accessory further comprises a truck box canopy, said canopy having at least one said clip means attached thereto.

25. The apparatus of claim 24, wherein said clip means attached to said canopy has a flange which extends outwardly from said longitudinal axis of said racket strip.

26. The apparatus of claim 24, wherein said accessory further comprises:
   (a) a second clip means which engages a second edge of said bar rail; and
   (b) means to secure said second clip means to said canopy.

27. The apparatus of claim 1, wherein said accessory further comprises vertical posts having at least one said clip means attached thereto, and horizontal side rails secured to said vertical posts.

28. The apparatus of claim 1, wherein said clip means further comprises a second hooked flange, said hooked flange hooking onto and contacting an opposing edge of said bar rail, engagement of said hooked flange with said edge of said bar rail and engagement of said second hooked flange with said opposing edge of said bar rail restricting transverse movement of said accessory with respect to said longitudinal axis of said bar rail.

29. The apparatus of claim 1, wherein at least two sides of said ratchet strip are provided with a plurality of outwardly extending teeth wherein said teeth on each said side extend substantially perpendicularly outward from said longitudinal axis of said ratchet strip.

30. The apparatus of claim 1, further comprising at least one spacer or washer strip juxtaposed between said ratchet strip and the support structure.

31. The apparatus of claim 1, wherein a first ratchet strip abuts a second ratchet strip, said first ratchet strip having a longitudinal axis, said second ratchet strip having a longitudinal axis, said first ratchet strip having outwardly extending teeth which extend substantially perpendicularly outward from said longitudinal axis of said first ratchet strip, said second ratchet strip having outwardly extending teeth which extend substantially perpendicularly outward from said longitudinal axis of said second ratchet strip, said first ratchet strip further having at least one end tooth extends substantially perpendicular outward from said longitudinal axis of said second ratchet strip and which matches or corresponds in spacing with said outwardly extending teeth of said second ratchet strip.

32. The apparatus of claim 1, wherein said support structure is on an automotive vehicle.

33. The apparatus of claim 32, wherein said support structure is an upper perimeter of a truck box.

* * * * *

UNITED STATES PATENT AND TRADEMARK OFFICE
CERTIFICATE OF CORRECTION

PATENT NO. : 5,139,375

DATED : August 18, 1992

INVENTOR(S) : Robert J. Franchuk

Page 1 of 2

It is certified that error appears in the above-identified patent and that said Letters Patent is hereby corrected as shown below:

Column 1, line 39, delete "then" before "in".

Column 6, line 32, delete "solid bar" after "steel".

Column 12, line 43, insert --.-- after "74".

Column 13, line 60, delete "98 edge" and insert therefor --edge 98--.

Column 15, line 61, delete "30B" and insert therefor --308--.

Column 17, line 43, delete "," and insert therefor --;--.

Column 17, line 44, delete "security" and insert therefor --securing--.

Column 17, line 61, delete "jail" and insert therefor --rail--.

Column 18, line 39, insert --upper-- between "said" and "clip".

Column 18, line 51, delete "space" and insert therefor --spacer--.

Column 18, line 53, delete "space" and insert therefor --spacer--.

UNITED STATES PATENT AND TRADEMARK OFFICE
CERTIFICATE OF CORRECTION

PATENT NO. : 5,139,375

DATED : August 18, 1992

INVENTOR(S) : Robert J. Franchuk

It is certified that error appears in the above-identified patent and that said Letters Patent is hereby corrected as shown below:

Column 18, line 54, delete "space" and insert therefor --spacer--.

Column 19, line 24, delete "comprise" and insert therefor --comprises--.

Signed and Sealed this

Twelfth Day of October, 1993

Attest:

BRUCE LEHMAN

Attesting Officer

Commissioner of Patents and Trademarks